United States Patent
Xiong et al.

(10) Patent No.: US 12,062,145 B2
(45) Date of Patent: Aug. 13, 2024

(54) SYSTEM AND METHOD FOR THREE-DIMENSIONAL SCENE RECONSTRUCTION AND UNDERSTANDING IN EXTENDED REALITY (XR) APPLICATIONS

(71) Applicant: Samsung Electronics Co., Ltd., Suwon-si (KR)

(72) Inventors: Yingen Xiong, Mountain View, CA (US); Christopher A. Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 17/811,012

(22) Filed: Jul. 6, 2022

(65) Prior Publication Data

US 2023/0245396 A1 Aug. 3, 2023

Related U.S. Application Data

(60) Provisional application No. 63/305,465, filed on Feb. 1, 2022.

(51) Int. Cl.
*G06T 19/00* (2011.01)
*G01B 11/22* (2006.01)
(Continued)

(52) U.S. Cl.
CPC ........... *G06T 19/006* (2013.01); *G01B 11/22* (2013.01); *G01C 21/1656* (2020.08); *G06T 7/50* (2017.01);
(Continued)

(58) Field of Classification Search
CPC .......... G06T 19/006; G06T 7/50; G06T 7/70; G06T 17/20; G06T 2207/30244;
(Continued)

(56) References Cited

U.S. PATENT DOCUMENTS 10,482,616 B2 11/2019 Chang et al.
10,573,078 B2 2/2020 Nourai et al.
(Continued)

FOREIGN PATENT DOCUMENTS

CN 106056664 A 10/2016
CN 108335328 A 7/2018
(Continued)

*Primary Examiner* — Motilewa Good-Johnson

(57) ABSTRACT

A method includes receiving depth data of a real-world scene from a depth sensor, receiving image data of the scene from an image sensor, receiving movement data of the depth and image sensors from an IMU, and determining an initial 6DOF pose of an apparatus based on the depth data, image data, and/or movement data. The method also includes passing the 6DOF pose to a back end to obtain an optimized pose and generating, based on the optimized pose, image data, and depth data, a three-dimensional reconstruction of the scene. The reconstruction includes a dense depth map, a dense surface mesh, and/or one or more semantically segmented objects. The method further includes passing the reconstruction to a front end and rendering, at the front end, an XR frame. The XR frame includes a three-dimensional XR object projected on one or more surfaces of the scene.

20 Claims, 13 Drawing Sheets

(51) Int. Cl.
  *G01C 21/16* (2006.01)
  *G06T 7/50* (2017.01)
  *G06T 7/70* (2017.01)
  *G06T 17/20* (2006.01)
  *G06V 10/25* (2022.01)
  *G06V 10/26* (2022.01)
  *G06V 10/77* (2022.01)
  *G06V 20/20* (2022.01)

(52) U.S. Cl.
  CPC ............... *G06T 7/70* (2017.01); *G06T 17/20* (2013.01); *G06V 10/25* (2022.01); *G06V 10/26* (2022.01); *G06V 10/7715* (2022.01); *G06V 20/20* (2022.01); *G06T 2207/30244* (2013.01)

(58) Field of Classification Search
  CPC . G06T 7/11; G06T 17/00; G06T 2207/20084; G01B 11/22; G01C 21/1656; G06V 10/25; G06V 10/26; G06V 10/7715; G06V 20/20; G06V 20/64; G06F 3/011
  See application file for complete search history.

(56) References Cited

U.S. PATENT DOCUMENTS

| | | |
|---|---|---|
| 10,789,752 B2 | 9/2020 | Yu |
| 10,962,355 B2 | 3/2021 | Chang et al. |
| 11,062,492 B2 | 7/2021 | Starkey |
| 11,199,414 B2 | 12/2021 | Zhang et al. |
| 11,238,659 B2 * | 2/2022 | Swaminathan ......... G06T 17/00 |
| 11,250,618 B2 * | 2/2022 | Bradley ................... G06T 7/593 |
| 11,808,944 B2 * | 11/2023 | Hoover ................ H04N 13/156 |
| 2017/0193699 A1 * | 7/2017 | Mehr ....................... G06F 17/10 |
| 2018/0005015 A1 | 1/2018 | Hou et al. |
| 2018/0018787 A1 | 1/2018 | Giancola et al. |
| 2018/0018805 A1 | 1/2018 | Kutliroff et al. |
| 2018/0278918 A1 * | 9/2018 | Peri ....................... H04N 13/106 |
| 2019/0304170 A1 * | 10/2019 | Meilland ............... G06T 15/205 |
| 2019/0392630 A1 * | 12/2019 | Sturm .................... G06V 20/20 |
| 2020/0302681 A1 * | 9/2020 | Totty ..................... G06T 15/205 |
| 2020/0372718 A1 * | 11/2020 | Molyneaux .......... H04N 13/239 |
| 2021/0201577 A1 | 7/2021 | Wang |
| 2021/0258476 A1 * | 8/2021 | Reddy .................. H04N 23/661 |
| 2021/0306614 A1 * | 9/2021 | Wiman ................... G06T 7/593 |
| 2021/0347053 A1 * | 11/2021 | Lee .......................... B25J 13/00 |
| 2021/0407302 A1 * | 12/2021 | Liu ......................... G06T 7/579 |
| 2022/0230397 A1 * | 7/2022 | Xiong ..................... G06T 7/269 |
| 2023/0140170 A1 * | 5/2023 | Xiong .................. H04N 13/239 345/419 |
| 2023/0196690 A1 * | 6/2023 | Watson ................ G06V 10/771 345/633 |

FOREIGN PATENT DOCUMENTS

| | | |
|---|---|---|
| CN | 109978931 A | 7/2019 |
| CN | 110717494 A | 1/2020 |

* cited by examiner

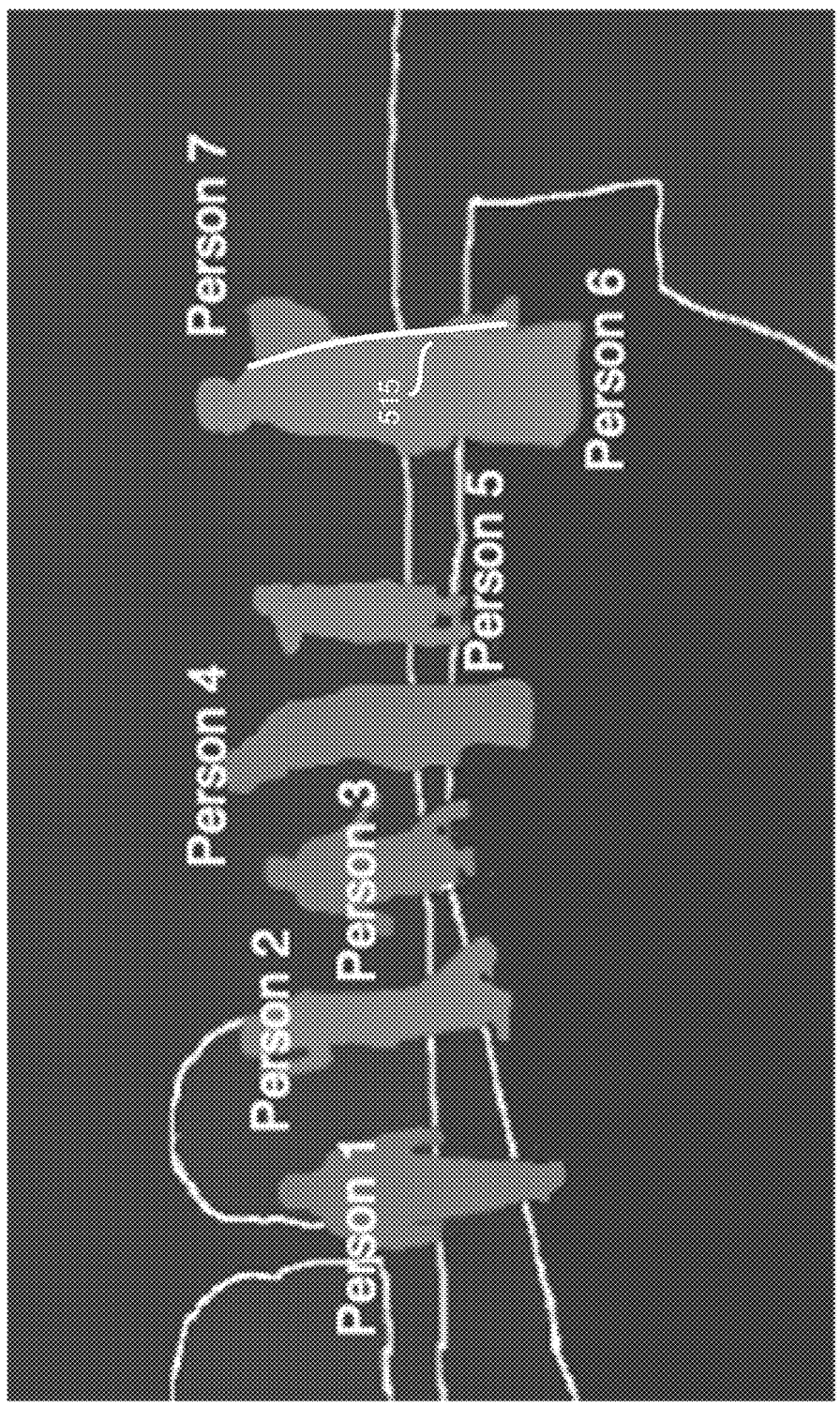

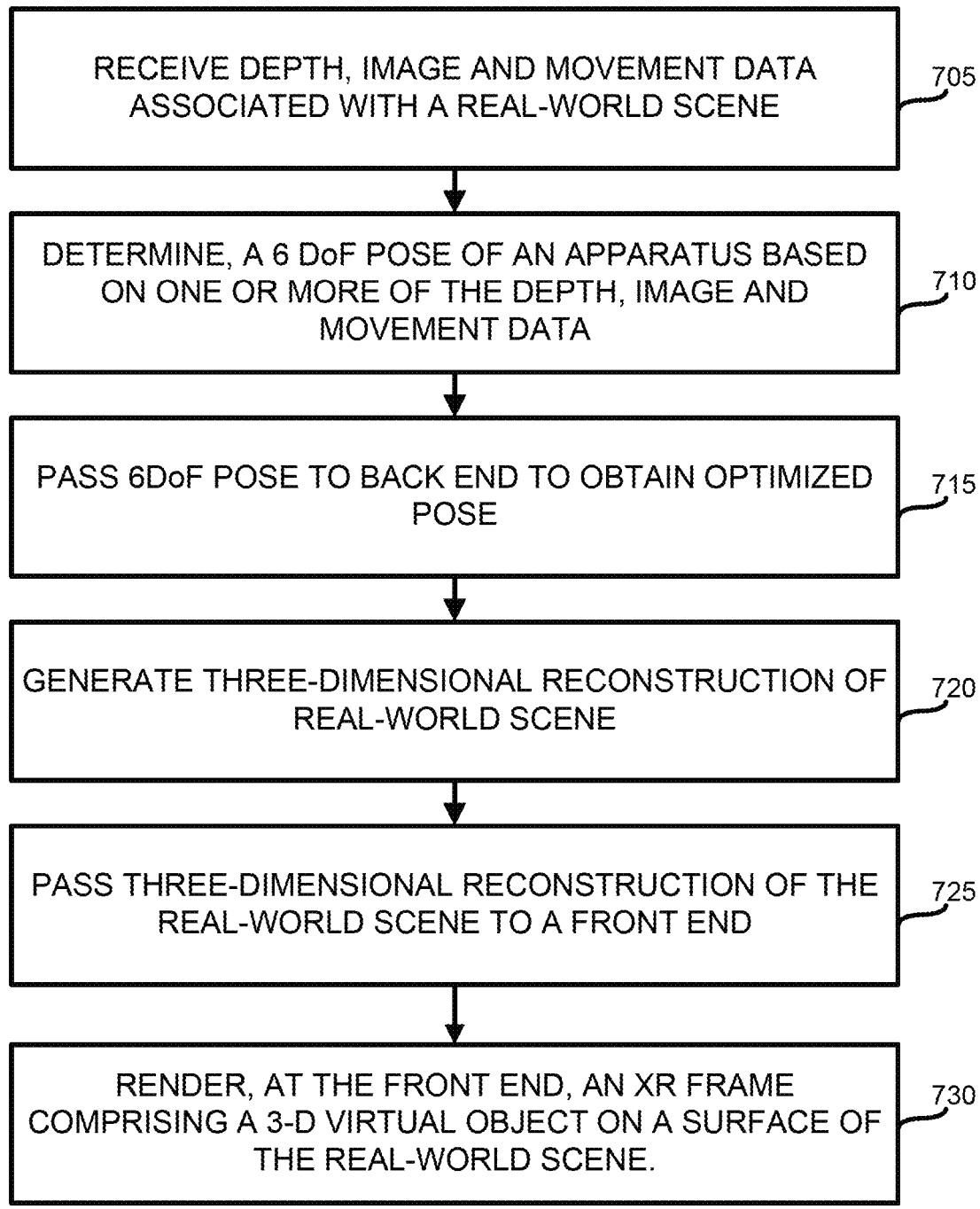

SYSTEM AND METHOD FOR THREE-DIMENSIONAL SCENE RECONSTRUCTION AND UNDERSTANDING IN EXTENDED REALITY (XR) APPLICATIONS

CROSS-REFERENCE TO RELATED APPLICATION AND CLAIM OF PRIORITY

This application claims priority under 35 U.S.C. § 119(e) to U.S. Provisional Patent Application No. 63/305,465 filed on Feb. 1, 2022. The above-identified provisional patent application is hereby incorporated by reference in its entirety.

TECHNICAL FIELD

This disclosure relates to systems and methods for generating extended reality (XR) displays that combine image data of real-world objects of a user's current operating environment (such as walls, floors, or furniture) with virtual objects presented to appear as elements of the real-world operating environment. More specifically, this disclosure relates to a system and method for performing three-dimensional scene reconstruction and understanding for XR applications.

BACKGROUND

Smartphones, tablets, and other readily portable, battery-powered devices that combine sensors for tracking one or more of the device's motion or a user's position relative to the device have become the dominant computing platform for many users. The integration of processing power, motion, and visual sensors in a compact, battery-powered apparatus presents new and exciting opportunities for extending the functionality of smartphones and tablets—including, without limitation, motion or viewpoint-adjusted projection of extended reality (XR) displays that provide natural-looking projections of virtual objects on image data of real-world objects in a user's operating environment.

Unfortunately, extending the functionality of (typically) battery-powered devices to support providing XR displays present new, as-yet unsolved technical challenges. Specifically, developing a spatial and semantic understanding of a real-world operating environment of an XR platform can involve computationally-intensive operations using machine learning models for object recognition, as well as computationally intensive operations to generate detailed depth maps from sparse data or by generating disparity maps. Additionally, generating detailed depth maps and accurate, machine-level understandings of a real-world environment facilitates the incorporation of a wide range of reprojection and cloning effects within an XR display. Examples of such effects include, without limitation, "freeze motion" effects and creating additional, virtual instances of real-world objects. While portable, battery-powered, front-end devices may be able to perform such computationally intensive operations in short bursts or limited quantities, doing so stresses battery and processor resources, exhausting batteries and generating heat. From an overall system perspective, this can be undesirable.

SUMMARY

This disclosure provides a system and method for three-dimensional scene reconstruction and understanding in extended reality (XR) applications.

In a first embodiment, an apparatus includes a depth sensor, an image sensor, an inertial measurement unit (IMU), and a controller. The controller is configured to receive depth data of a real-world scene from the depth sensor, receive image data of the real-world scene from the image sensor, receive movement data of the depth sensor and the image sensor from the IMU, and determine an initial six-degree-of-freedom (6DOF) pose of the apparatus based on at least one of the depth data, the image data, and the movement data. The controller is also configured to pass the initial 6DOF pose of the apparatus to a back end to obtain an optimized pose and generate, based on the optimized pose, the image data, and the depth data, a three-dimensional reconstruction of the real-world scene, where the three-dimensional reconstruction includes at least one of a dense depth map of the real-world scene, a dense surface mesh of the real-world scene, and one or more semantically segmented objects. The controller is further configured to pass the three-dimensional reconstruction of the real-world scene to a front end and render, at the front end, an XR frame, where the XR frame includes a three-dimensional XR object projected on one or more surfaces of the real-world scene.

In a second embodiment, a method for performing three-dimensional scene reconstruction and understanding for XR applications includes receiving depth data of a real-world scene from a depth sensor of an apparatus, receiving image data of the real-world scene from an image sensor of the apparatus, receiving movement data of the depth sensor and the image sensor from an IMU of the apparatus, and determining an initial 6DOF pose of the apparatus based on at least one of the depth data, the image data, and the movement data. The method also includes passing the initial 6DOF pose of the apparatus to a back end to obtain an optimized pose and generating, based on the optimized pose, the image data, and the depth data, a three-dimensional reconstruction of the real-world scene, where the three-dimensional reconstruction includes at least one of a dense depth map of the real-world scene, a dense surface mesh of the real-world scene, and one or more semantically segmented objects. The method further includes passing the three-dimensional reconstruction of the real-world scene to a front end and rendering, at the front end, an XR frame, where the XR frame includes a three-dimensional XR object projected on one or more surfaces of the real-world scene.

In a third embodiment, a non-transitory computer-readable medium contains instructions that, when executed by at least one processor of an apparatus including a depth sensor, an image sensor, and an IMU, causes the apparatus to receive depth data of a real-world scene from the depth sensor, receive image data of the real-world scene from the image sensor, receive movement data of the depth sensor and the image sensor from the IMU, and determine an initial 6DOF pose of the apparatus based on at least one of the depth data, the image data, and the movement data. The medium also contains instructions that, when executed by the at least one processor, causes the apparatus to pass the initial 6DOF pose of the apparatus to a back end to obtain an optimized pose and generate, based on the optimized pose, the image data, and the depth data, a three-dimensional reconstruction of the real-world scene, where the three-dimensional reconstruction includes at least one of a dense depth map of the real-world scene, a dense surface mesh of the real-world scene, and one or more semantically segmented objects. The medium further contains instructions that, when executed by the at least one processor, causes the apparatus to pass the three-dimensional reconstruction of the real-world scene to a front end and render, at the front end, an XR frame, where the XR frame includes a three-dimensional XR object projected on one or more surfaces of the real-world scene.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory, random access memory, a hard disk drive, a compact disc, a digital video disc, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 5A-5C illustrate visual aspects of object detection, semantic segmentation, and instance segmentation according to some embodiments of this disclosure;

FIG. 7 illustrates operations of an example method for performing three-dimensional scene reconstruction and scene understanding according to some embodiments of this disclosure.

DETAILED DESCRIPTION

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
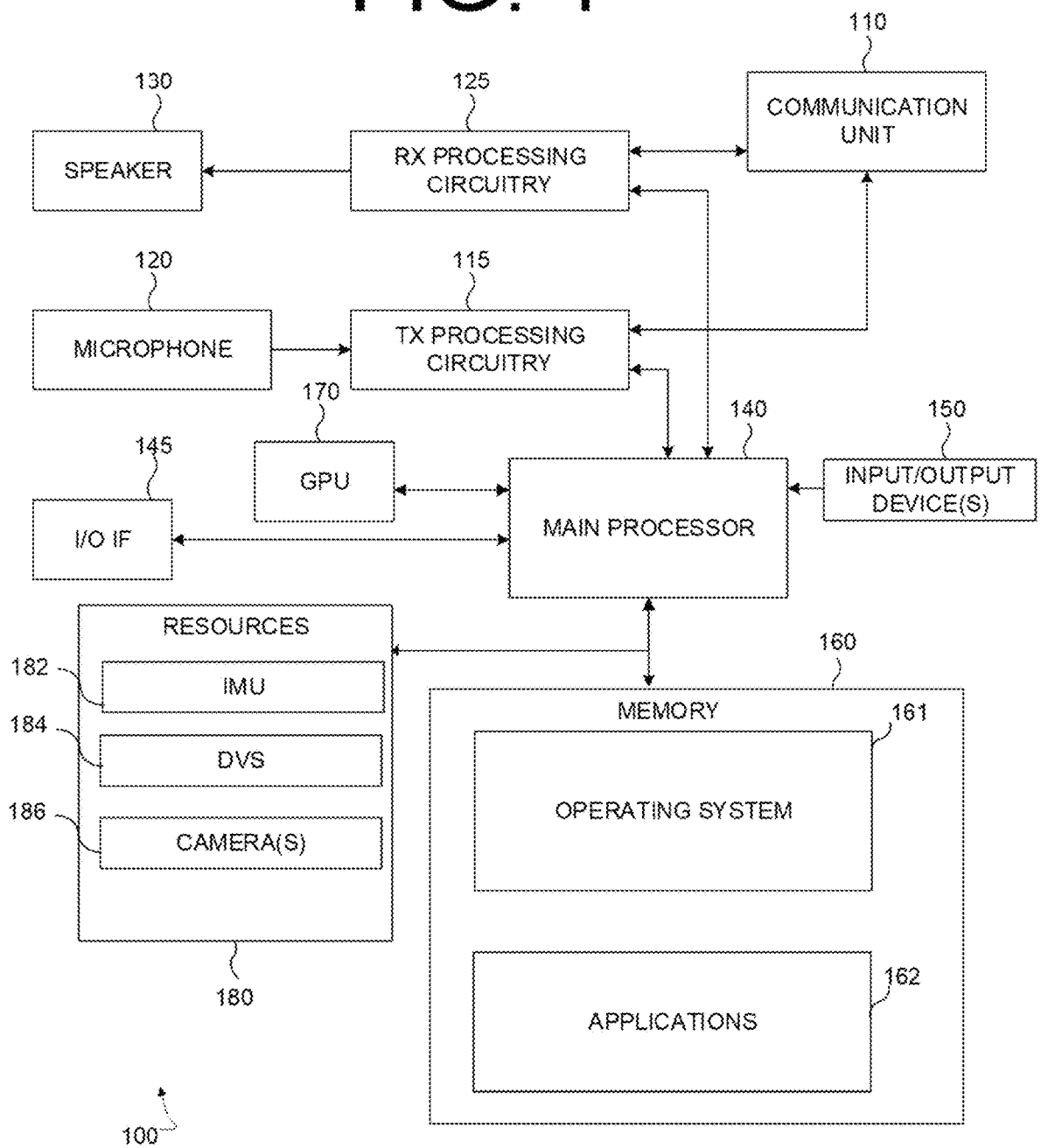
FIG. 1 illustrates an example of an electronic device for performing three-dimensional scene reconstruction and comprehension according to some embodiments of this disclosure.

FIG. 1 illustrates a non-limiting example of a device 100 for performing three-dimensional scene reconstruction and understanding in extended reality (XR) applications according to some embodiments of this disclosure. The embodiment of the device 100 shown in FIG. 1 is for illustration only, and other configurations are possible. Suitable devices come in a wide variety of configurations, and FIG. 1 does not limit the scope of this disclosure to any particular implementation of a device. For example, the device 100 may be implemented as a head mounted display (HMD) or as a separate device (such as a smartphone) controlling an augmented reality (AR) display presented at a connected HMD (such as through a BLUETOOTH or ZIGBEE connection).

As shown in the non-limiting example of FIG. 1, the device 100 includes a communication unit 110 that may include, for example, a radio frequency (RF) transceiver, a BLUETOOTH transceiver, or a WI-FI transceiver, etc. The device 100 also includes transmit (TX) processing circuitry 115, a microphone 120, and receive (RX) processing circuitry 125. The device 100 further includes a speaker 130, a main processor 140, an input/output (I/O) interface (IF) 145, I/O device(s) 150, and a memory 160. The memory 160 includes an operating system (OS) program 161 and one or more applications 162.

Applications 162 can include games, social media applications, applications for geotagging photographs and other items of digital content, virtual reality (VR) applications, augmented reality (AR) applications, extended reality (XR) applications, operating systems, device security (such as anti-theft and device tracking) applications, or any other applications that access resources of the device 100. The resources of the device 100 may include, without limitation, the speaker 130, microphone 120, I/O devices 150, and additional resources 180. According to some embodiments, applications 162 include XR applications that can project, on a display device, an XR display that combines elements of a view of a real-world operating environment of the device 100 in combination with one or more virtual objects, where each virtual object's position or dynamics embody a physical interaction (such as appearing to sit on a real-world table or bouncing off of a wall of a room) with a physical object of the real-world operating environment.

The communication unit 110 may receive an incoming RF signal, such as a near field communication signal like a BLUETOOTH or WI-FI signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, the communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100 or legacy applications developed for earlier platforms. Additionally, the main processor 140 can be manufactured to include program logic for implementing techniques for monitoring suspicious application access according to some embodiments of this disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the I/O device(s) 150. The operator of the device 100 can use the I/O device(s) 150 to enter data into the device 100. The I/O device(s) 150 can include a keyboard, HMD, touchscreen, mouse, track ball, or other device(s) capable of acting as a user interface to allow a user to interact with the device 100. In some embodiments, the I/O device(s) 150 can include a touch panel, a (digital) pen sensor, a key, or an ultrasonic input device. The I/O device(s) 150 can include one or more screens, which can be a liquid crystal display, a light-emitting diode (LED) display, an optical LED (OLED), an active-matrix OLED (AMOLED), or other screen(s) capable of rendering graphics.

The memory 160 is coupled to the main processor 140. According to some embodiments, part of the memory 160 includes a random-access memory (RAM), and another part of the memory 160 includes a Flash memory or other read-only memory (ROM).

According to some embodiments, the device 100 can further include a separate graphics processing unit (GPU) 170. Also, according to some embodiments, the device 100 may further include a variety of additional resources 180 that can, if permitted, be accessed by the applications 162. According to particular embodiments, the additional resources 180 may include an accelerometer or inertial motion unit 182, which can detect movements of the device 100 along one or more degrees of freedom. As another example, according to particular embodiments, the additional resources 180 may include a dynamic vision sensor (DVS) 184 or one or more cameras 186.

Although FIG. 1 illustrates one example of a device 100 for generating a three-dimensional reconstruction of a real-world scene and developing a scene understanding for an XR application, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

FIGS. 2A-2F illustrate example aspects of scene reconstruction and reprojection in XR applications according to some embodiments of this disclosure. For convenience, elements common to more than one of FIGS. 2A-2F are numbered similarly.

Figure 2A:
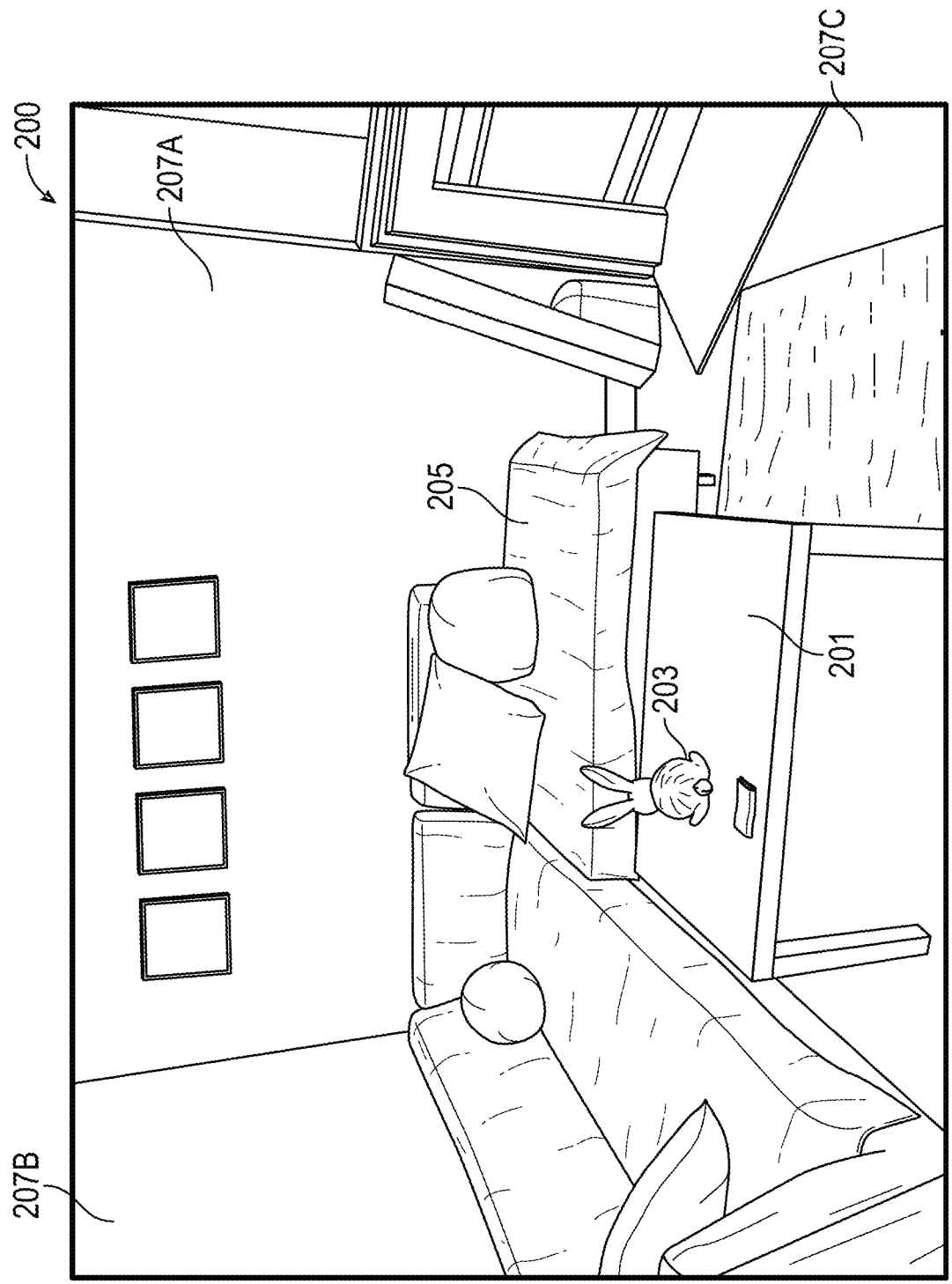
FIGS. 2A-2F illustrate example aspects of scene reconstruction and reprojection in XR applications according to some embodiments of this disclosure.

Referring to the illustrative example of FIG. 2A, a frame 200 of image data of a real-world operating environment of an apparatus (such as an HMD embodying the componentry and architecture of the device 100 in FIG. 1) is shown. In this example, the frame 200 includes a raster of pixels representing color and luminance values of points within the operating environment as observed at one or more cameras having a specific pose. As used in this description, the expressions "pose" and "camera pose" encompass an expression of the location and viewing angle of a vantage point from which a frame of image data (such as the frame 200) is collected. The frame 200 includes objects that human viewers innately recognize as instances of known objects having known structural properties (such as objects that can support other objects or need to stand on three or more legs) and innately-identifiable spatial relationships to each other. For example, a first object 201 includes a collection of rigid planar sections of material that human viewers recognize as a coffee table. Upon the coffee table is positioned a second object 203, which human viewers recognize as a plush bunny. The second object 203 sits in front of a third object 205, which human viewers recognize as a sectional sofa. Additionally, the operating environment is bounded on two sides by first and second planes 207A and 207B, which human viewers recognize as first and second walls. Further, the real-world operating environment shown in the frame 200 is bounded by a third plane 207C, which human viewers understand to be the floor.

In the illustrative example described with reference to FIGS. 2A-2F, an XR display extending the real-world scene represented by the frame 200 is generated. Specifically, in this example, the second object 203 (the plush bunny sitting on the coffee table) is duplicated, and virtual bunnies appearing to interact with the physical objects of the real-world operating environment are shown in the frame 200. Additionally, elements of the scene shown in the frame 200 are reprojected onto a different set of real-world objects and presented from a different camera angle. As the expression "extended reality" suggests, in the explanatory example of FIGS. 2A-2F, image data of the constituent components of the real-world operating environment, such as the furniture, planes of the walls and floors, and recognizable objects, is used to create an image that includes an extension of the objects present in the original image data.

Humans can typically visualize multiple aspects of what the room shown in the frame 200 might look like from a different vantage point or aspects of how additional bunnies might appear in the scene (such as the bunnies' faces and regions in the operating environment in which they are likely or not likely to be found). For example, as non-flying mammals, additional bunnies would be found on surfaces of the environment rather than levitating in the air. At least initially, a computing platform generating an XR display may have no such innate understanding of how a virtual object could plausibly interact with the objects shown in the frame 200. Rather, the computing platform may initially understand the frame 200 as including a plurality of regions of pixels with similar color and/or luminance values. In order to generate an effective XR display, the computing platform can obtain both a spatial understanding of the scene represented in the frame 200 (such as an awareness of sizes, shapes, and relative depths), as well as a semantic understanding of the scene (such as an understanding that the third plane 207C is a floor, which is a plane that cannot be broken through and towards which objects in the frame 200 are drawn).

Figure 2B:
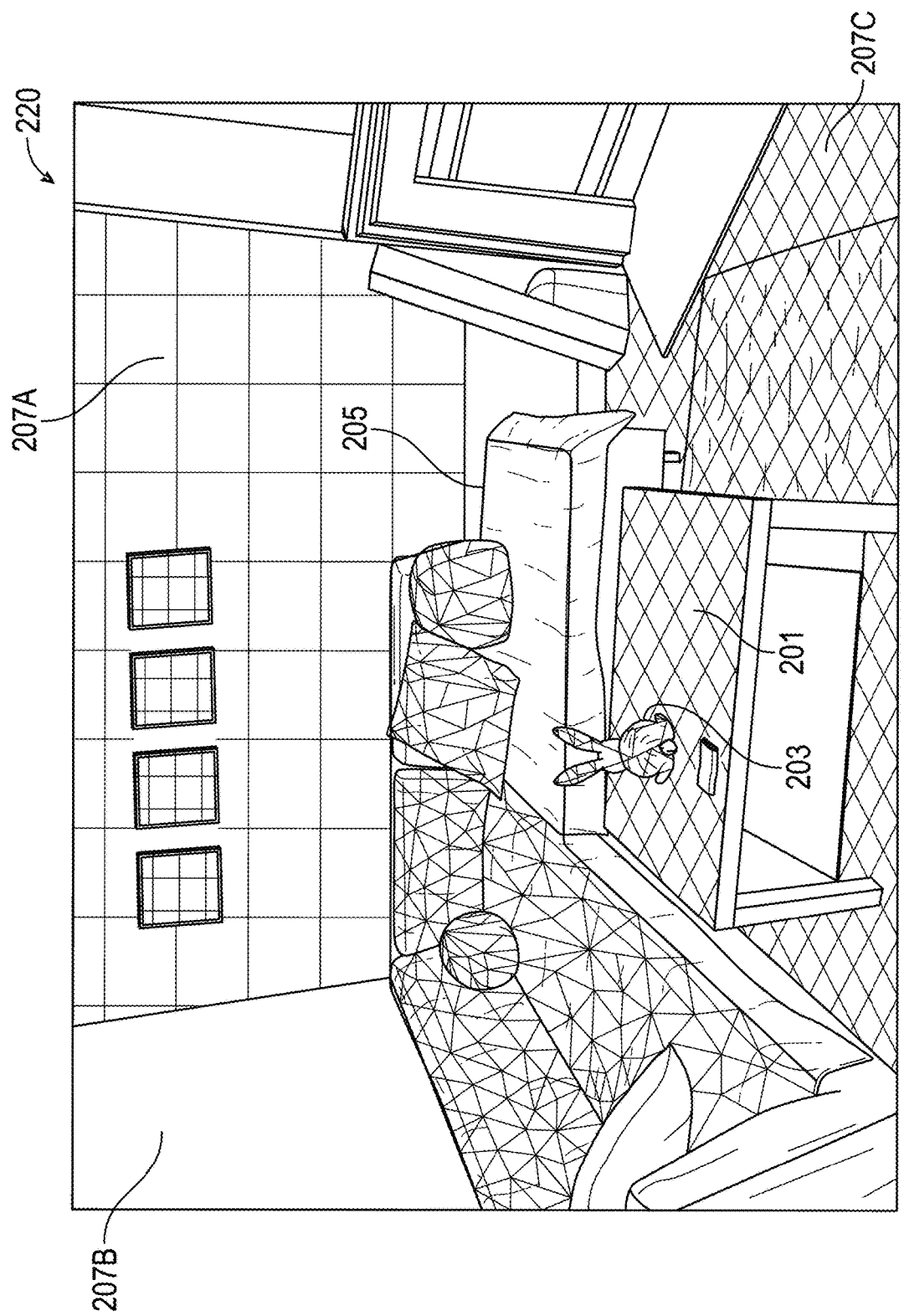

Referring to the illustrative example of FIG. 2B, in order to provide an XR display in which virtual objects interact with and adhere (at least in part) to the spatial or physical constraints of object in a real-world, some embodiments need to generate a three-dimensional reconstruction 220 of the scene shown in the frame 200. As shown in FIG. 2B, in some embodiments, the three-dimensional reconstruction 220 includes a surface mesh, such as an incremental or dense surface mesh. As used in this disclosure, the expression "mesh" encompasses a map of depth point values in which adjacent depth points may be connected by edges to define planar regions. From the three-dimensional reconstruction, the location of one or more fundamental planes (such as the ground plane and walls) and major objects (such as the couch and coffee table) can be recognized. Additionally, dense depth maps of objects that can be reprojected are obtained.

Figure 2C:
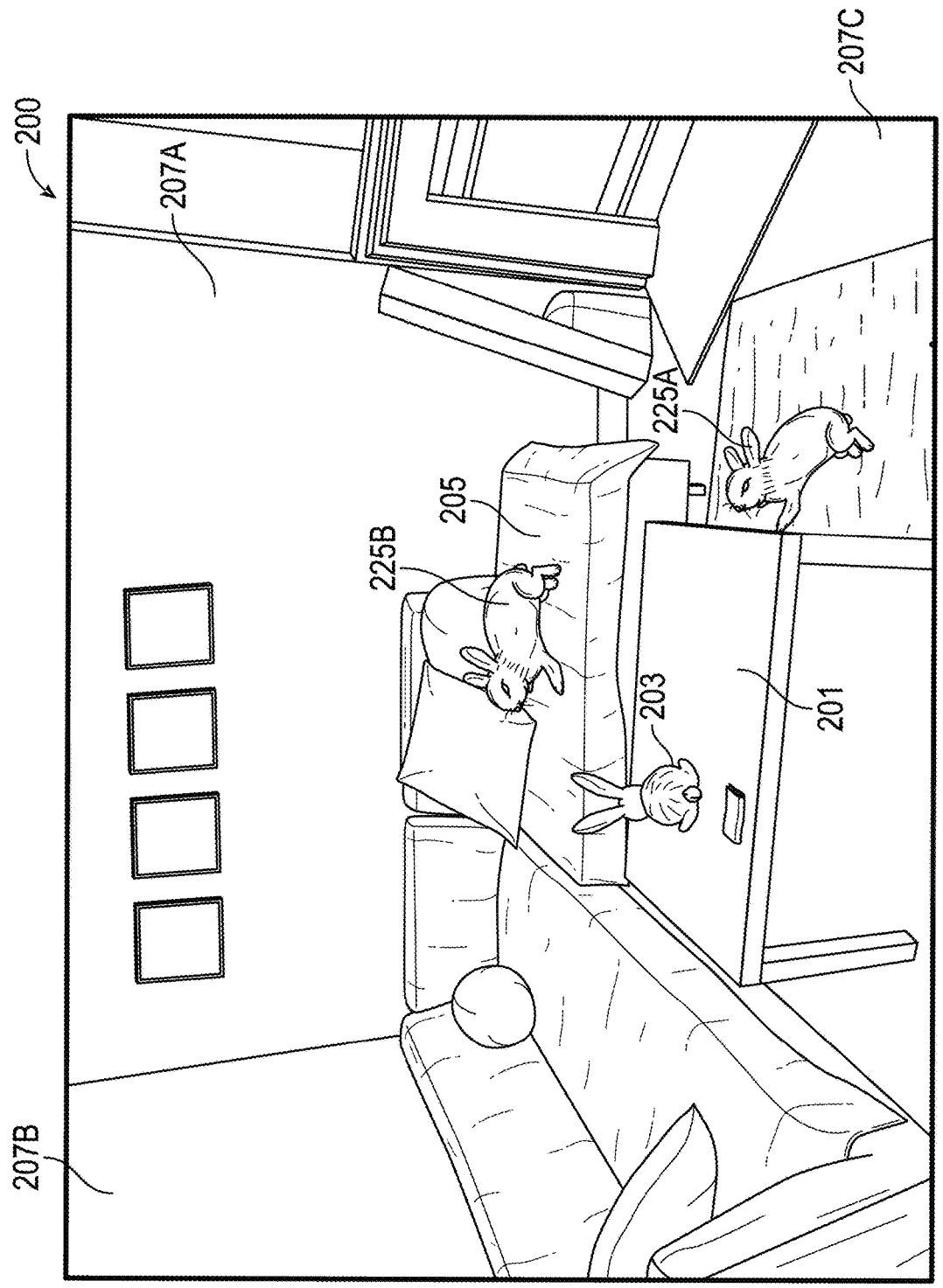

Referring to the explanatory example of FIG. 2C, having decomposed the scene based on the three-dimensional reconstruction 220, and (in some embodiments) having performed object recognition on the image data in the frame 200 to obtain classifications of instances of recognized objects in the scene, the computing platform supporting one or more XR applications begins utilizing the understanding of the real-world operating environment encoded in the object classifications and three-dimensional reconstruction to build an XR display. The XR display can extend the objects and underlying structure of the real-world environment in some manner. In the illustrative example of FIG. 2C, first and second additional instances 225A and 225B of the second object 203 are created. As shown in FIG. 2C, the first and second additional instances 225A and 225B are not simply copied and pasted instances of the second object 203 but rather present different poses. To accomplish this, some embodiments of this disclosure recognize that the second object 203 is a bunny and draw upon stored knowledge of the general shape of a bunny to create the first and second additional instances 225A and 225B.

Figure 2D:

Referring to the explanatory example of FIG. 2D, an example of an XR display 299 is shown in the figure. As shown in FIG. 2D, elements of the scene shown in FIG. 2A have been reprojected onto different real-world objects. Also, as discussed with reference to FIG. 2C, the XR display 299 also includes the first and second additional instances 225A and 225B of the second object 203. In this way, the image data of the frame 200 has been "extended" to create the new, photorealistic scene shown in the XR display 299.

Figure 2E:
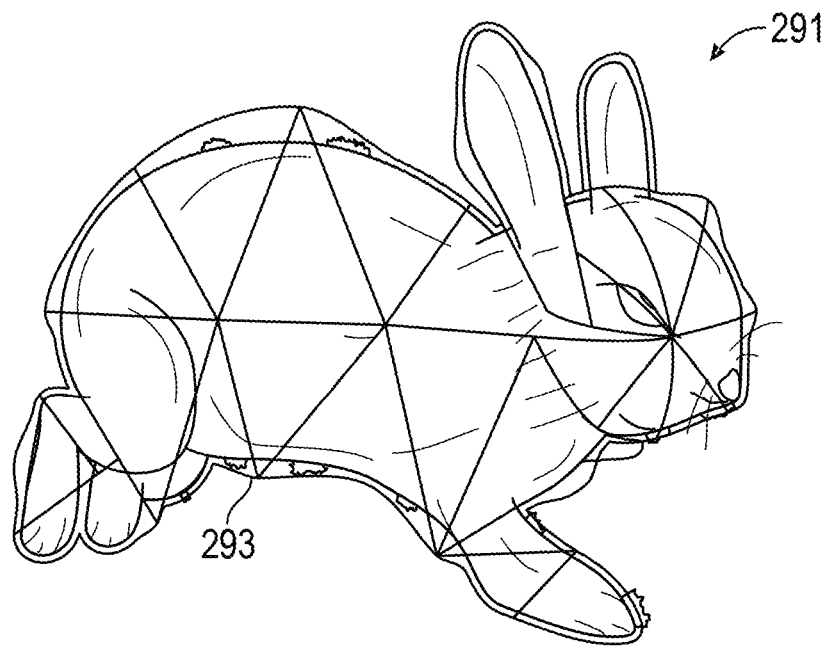
Figure 2F:
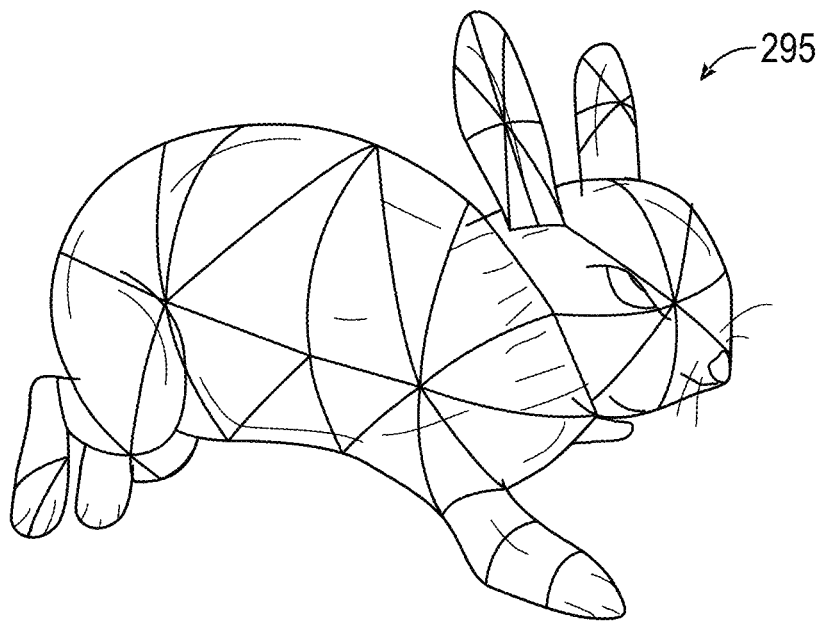

Significant factors affecting the performance with which a computing platform can generate XR displays, such as the XR display 299, include without limitation, the accuracy and efficiency with which the processing platform can perform scene reconstruction and scene comprehension. Without these, reprojection and creating additional, re-posed instances of scene objects can be difficult if not impossible. FIGS. 2E and 2F illustrate aspects of the effects of inaccurate scene reconstruction on generating an XR display in some embodiments As used in this disclosure, the expression "scene reconstruction" encompasses developing a dense depth map and representation of a plane structure of an operating environment from source data received at a computing platform, where the source data includes image data of the scene.

Referring to the illustrative example of FIG. 2E, an example of a first reprojection 291 of an object in a scene is shown in the figure. According to some embodiments, the first reprojection 291 is obtained by generating, from a dense depth map, a representation of the three-dimensional structure of an object in the scene (in this case, a rabbit). The representation of the three-dimensional structure may include a linked set of data points (such as an incremental mesh) corresponding to linked points on the surface of the object. From the representation of the three-dimensional structure, a view of the object from a different perspective (such as a reprojection) can be generated. However, the quality of the reprojection can be heavily dependent on the quality of the representation of the three-dimensional structure of the object, and errors in the depth map of the object or location of the boundaries of the object can be conspicuously propagated in the reprojection. As shown in the illustrative example of FIG. 2E, defects in the depth map or three-dimensional representation of a source object can produce artifacts (such as an artifact 293) in a reprojection, creating an unnatural or ragged appearance of objects in an XR display. From a performance standpoint, such artifacts make virtual objects look unrealistic in an XR display, which is typically undesirable.

Referring to the illustrative example of FIG. 2F, an example of a second reprojection 295 of the object is provided. In this example, the three-dimensional representation of the source object is mapped accurately and with sufficient detail to produce a reprojection of the object without the unwanted artifacts shown in FIG. 2E. As discussed in greater detail below, some embodiments of this disclosure provide, without limitation, the performance benefits of accurate, detailed scene reconstruction for XR displays in a way that is computationally efficient and that conserves processing and power resources at the processing platform. In embodiments in which the processing platform is battery-powered or worn on a user's head, these gains in computational efficiency can translate into highly beneficial gains in extended battery life and reduction of heat buildup from the processor(s) of the processing platform.

Although FIGS. 2A-2F illustrate examples of aspects of scene reconstruction and reprojection in XR applications, various changes may be made to FIGS. 2A-2F. For example, operational environments for devices can vary widely, and the contents of the images shown here are for illustration and explanation only.

Figure 3:
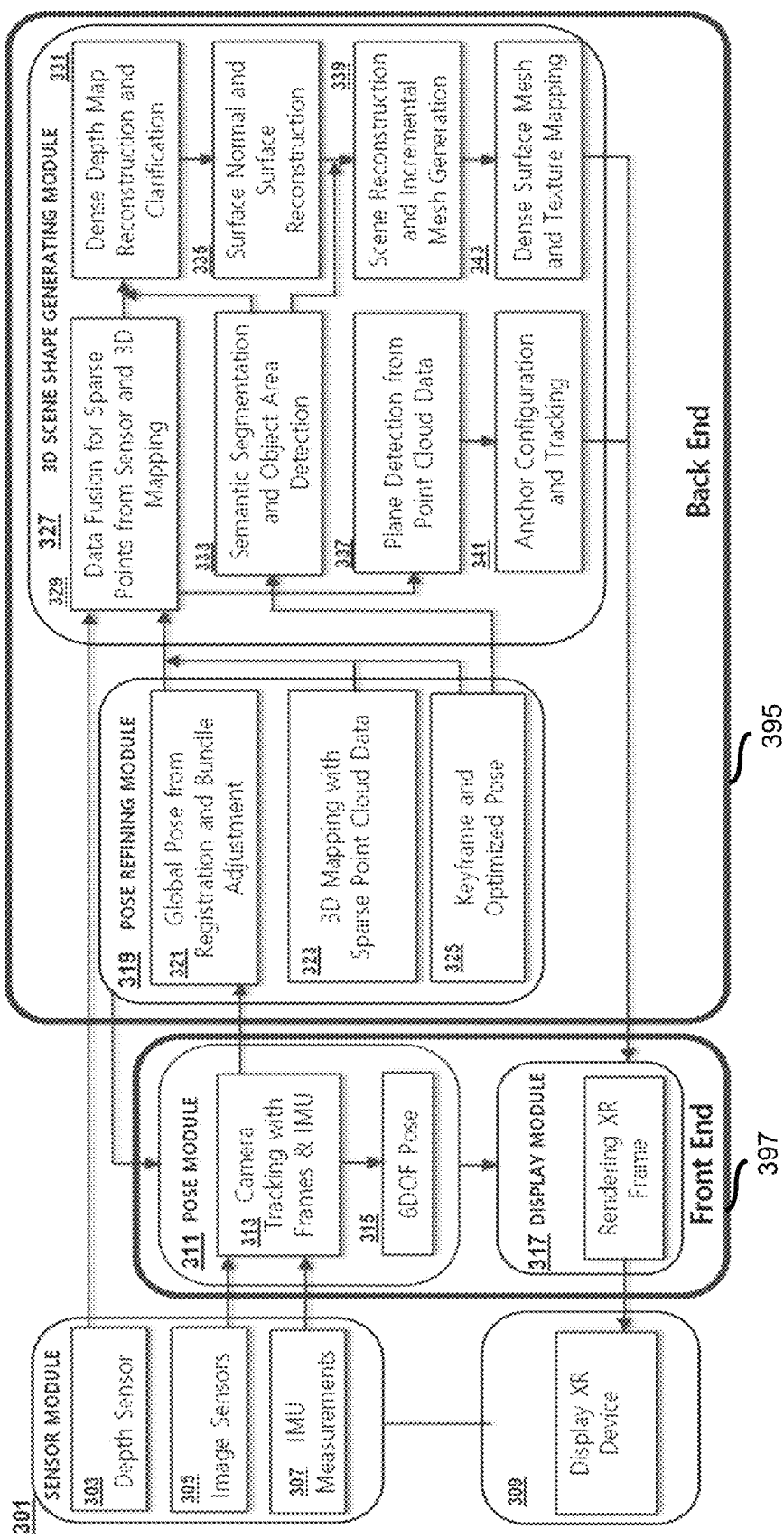
FIG. 3 illustrates an example of an architecture for performing three-dimensional scene reconstruction and comprehension according to some embodiments of this disclosure.

FIG. 3 illustrates an example architecture 300 for performing three-dimensional scene reconstruction and scene comprehension for XR applications according to some embodiments of this disclosure. For ease of explanation, the architecture 300 is described as being used in the device 100 of FIG. 1. However, the architecture 300 may be implemented using any suitable device(s) and in any suitable system(s).

Certain existing approaches for tuning and improving the performance of scene reconstruction and scene comprehension for XR applications seek to locally optimize stages (such as data fusion depth reconstruction or volume based-reconstruction) of a processing pipeline. Some embodiments according to this disclosure adopt a holistic approach to achieving performance gains through the use of both refined processing stages and the overall architecture of the processing pipeline. Accordingly, the holistic approach embodied by some embodiments according to this disclosure can provide significant performance gains beyond those achievable with incremental or localized approaches.

Referring to the illustrative example of FIG. 3, the architecture 300 includes four main stages or modules, at least some of which include multiple sub-modules or processing stages. In this example, the four modules include a sensor module 301, an XR display device 309, a front end 397, and a back end 395. Depending on the embodiment, two or more of the sensor module 301, XR display device 309, front end 397, and back end 395 may be implemented using separate processing platforms (such as an HMD and a smartphone). However, in many embodiments, the sensor module 301 and XR display device 309 may represent a common piece of hardware, given that XR displays are often reprojected in response to a user's pose and it is often useful for the image sensor to be trained on a field of view significantly overlapping with the field of view of the user's own eyes.

According to various embodiments, the sensor module 301 includes a suite of sensors disposed on an apparatus, such as near a user's head (like in an HMD), for collecting image and depth data of the user's real-world operating environment, as well as data indicating a pose associated with the image and depth data. Here, the pose may be expressed as a first set of values quantifying a sensor's location within an operating environment and a second set of values quantifying the direction in which a sensor is pointed. For example, a six-degree-of-freedom ("6DOF") pose measurement may capture a sensor's physical location using three coordinates in a Cartesian coordinate system and express the direction in which the sensor is pointed using a three-dimensional vector.

In this example, the sensor module 301 includes a depth sensor 303, which is configured to obtain measurements of the depths or distances between real world objects in a field of view and the depth sensor 303. Examples of sensors that may be used as the depth sensor 303 include, without limitation, time-of-flight sensors, structured light sensors (which project a known pattern onto a field of view and determine depths based on the distortions of the pattern as projected), and visual sensors (which may include a stereoscopic pair of image sensors from which depth values may be obtained based on differences between the two sensors' images of the same scene). As shown in FIG. 3, the sensor module 301 also includes at least one image sensor 305, which can be configured to obtain image data of a real-world operating environment from which object recognition (and, where appropriate, scene reconstruction) can be performed. In some embodiments, the depth sensor 303 and the image sensor 305 can have overlapping fields of view so that image data can be used to assist in generating dense depth maps and depth data may be used to augment image data for object recognition. Examples of sensors that can be used as the image sensor 305 include, without limitation, digital cameras (such as cameras with CMOS sensors) or dynamic vision sensors (which, unlike CMOS sensors, do not output frames of image data across a full field of view but rather output a stream of events corresponding to changes in measured luminance at points on a raster grid). Depending on the application, dynamic vision sensors can be particularly advantageous in that they consume less energy than CMOS sensors and can record rapid motion with less blur. For other applications, such as where the real-world operating environment has low light or limited dynamism (meaning little change over time), CMOS sensors may be advantageous. According to some embodiments, the sensor module 301 further includes one or more inertial measurement units (IMU) 307, which are configured to capture changes in a user's location and the directionality of the depth sensor 303 and the image sensor 305. Examples of sensors suitable for use as the IMU 307 include, without limitation, accelerometers and digital gyroscopes.

Referring to the explanatory example of FIG. 3, the XR display device 309 includes a head-mounted display, smart glasses, or other apparatus having a screen through which an XR display (such as the XR display 299 in FIG. 2D) is presented to a user.

According to various embodiments, the architecture 300 splits up the operations of generating an XR display such that the often computationally-expensive tasks associated with generating a scene reconstruction and scene comprehension are performed by the back end 395 and obtaining initial pose data and rendering virtual objects of a frame of an XR display are performed by the front end 397. This bifurcation between the back end 395 and the front end 397 facilitates the reapportionment of the processing tasks associated with generating an XR display. As a result, the computationally-intensive tasks performed by the back end 395 may, in certain embodiments, be performed using multicore processor architectures (such as one where one set of processing cores is designed for energy efficiency and a second set of processing cores is designed for performance) or chips (such as neural processing units (NPUs) specifically intended for implementing neural networks and machine learning algorithms). Alternatively or additionally, in some embodiments, the back end 395 may be implemented at an accessory device that is less subject to the battery or processing power constraints commonly associated with HMDs or other user-worn or user-carried devices.

In the example architecture 300, the front end 397 is generally responsible for performing an initial determination of the pose of the apparatus including the sensor module 301 and rendering an XR frame utilizing a representation of the three-dimensional structure of the real-world operating environment. In this illustrative example, the front end 397 includes a pose module 311 and a display module 317. According to various embodiments, the pose module 311 receives, as inputs, image data from the image sensor(s) 305 and data from the IMU 307 and processes this data to obtain a 6DOF pose 315 associated with the sensor module 301. Once the pose of the sensor module 301 is determined, one or more object poses for one or more virtual objects rendered to appear on one or more surfaces of the real-world operating environment can be determined. Accordingly, using the 6DOF pose 315 and the scene reconstruction data output by the back end 395, the display module 317 can render an XR frame including a view of objects of a real-world operating environment and extended to include one or more virtual objects interacting with one or more of the detected surfaces or objects of the real-world operating environment.

Referring to the illustrative example of FIG. 3, the back end 395 may be implemented on the same processing platform at the front end 397 or the sensor module 301. However, one technical benefit of the architecture 300 and the division of the macro components of a processing pipeline for performing scene reconstruction and scene understanding between the discrete modules shown in FIG. 3 is that, in some embodiments, the back end 395 (which includes more computationally-intensive phases of the pipeline) may be implemented on a separate more-powerful processing platform than the front end 397 or the sensor module 301. In this example, the back end 395 includes a pose refining module 319. According to some embodiments, while often necessary for computing a 6DOF pose 315, the outputs of the sensors of the sensor module 301 can be noisy or contain artifacts that diminish the accuracy of the determined pose of the sensor module 301. In some embodiments, further processing can refine the accuracy of a 6DOF determination.

As shown in FIG. 3, the further processing operations undertaken by the pose refining module 319 may include an operation 321, where a global pose is determined from registration of image data and bundle adjustment. A global pose can refer to the location of the sensor module 301 in a world coordinate system, meaning a coordinate system also used to express the locations of objects within a real-world operating environment. According to various embodiments, bundle adjustment includes refining an estimate of the global pose based on multiple frames of image data obtained at different poses. As rays of light (also known as bundles) radiate light at a camera along predictable linear paths, the value of the global pose of the sensor module 301 may be adjusted to provide the best fit for the image data including multiple instances of the same object(s).

Referring to the illustrative example of FIG. 3, an operation 323 is used to further refine the estimation of the 6DOF pose of the sensor module 301 based on sparse point cloud data (such as depth data directly from the depth sensor 303) obtained across a plurality of different pose points. As with light rays from a particular object, the distance between the sensor module 301 may (excluding noise from the depth sensor 303) vary predictably with pose. During the operation 323, the initial 6DOF pose 315 may be further refined based on the sparse point cloud data, where the determined 6DOF pose value is adjusted to best fit the sparse cloud data obtained across multiple frames of point cloud data.

Recognizing that the source data from the sensor module 301 can be noisy and contain artifacts and that, from a pose estimation perspective, certain frames of sensor data may simply be better for pose estimation than others, an operation 325 can generate keyframes of image and depth sensor data and determine revised values of 6DOF pose values associated with the generated keyframes. A keyframe may represent a frame (such as a set of image and depth data) associated with a common capture time and pose. In some embodiments according to this disclosure, rather than tracking the changes in the pose of the sensor module 301 over time based on just a data feed from the sensor module 301, a series of keyframes can be determined, and the changes in view and pose at any instant in time can be determined based on intermediate values between keyframes. In this way, any noisiness in the originally-obtained sensor data from the sensor module 301 may be smoothed out and an improved, less jumpy XR experience may be provided through the XR display device 309. Additionally, depending on the embodiment, the determination of keyframes at the operation 325 may also conserve memory and storage resources at the processing platform implementing the back end 395.

Referring to the illustrative example of FIG. 3, the back end 395 further includes a three-dimensional scene shape generating module 327. According to various embodiments, the three-dimensional scene shape generating module 327 implements a processing pipeline that receives, as inputs, the refined pose determinations from the pose refining module 319 and depth sensor outputs from the sensor module 301. The three-dimensional scene shape generating module 327 outputs a digital representation 343 of the three-dimensionality of portions of the real-world operating environment captured in the sensor data (such as a surface mesh) and performs anchor configuration and tracking 341 for the real-world operating environment represented by the sensor mesh. The anchor configuration and tracking may include determining a consistent reference point (also known as an "anchor") for a coordinate system for defining the positions of real-world objects and positioning virtual objects.

Referring to the illustrative example of FIG. 3, during an operation 329, the three-dimensional scene shape generating module 327 performs data fusion for sparse points from depth data obtained from the depth sensor 303 and depth values obtained from parallax analysis of data from the image sensor 305. According to various embodiments, operation 329 includes integrating one or more point clouds of depth data of the real-world operating environment captured by the depth sensor(s) 303 with one or more point clouds of depth data of the operating environment determined from comparing parallax changes between two or more frames of image data obtained from the image sensor(s) 305 to create a single cloud of depth data points. Also, in some embodiments, one or more integration filters may be created and applied to remove noises in the source data and assign confidence weightings to the depth points of the integrated depth map.

As shown in FIG. 3, at an operation 331, a dense depth map is generated. The dense depth map covers, at a minimum, a portion of the real-world operating environment represented in the fused depth map generated by the operation 229. A dense depth map can represent a depth map (such as a mapping of depth values relative to a measurement point to locations in a coordinate system) generated from a source depth map with a lower depth point resolution. For example, a dense depth map may be obtained through guided interpolation and propagating additional depth point values to a sparser depth map based on one or more of spatial, color, and pose information, from which planes and regions of equivalent or reliably predictable depth in the neighborhood of existing depth values can be identified.

According to various embodiments, at an operation 335, the three-dimensional scene shape generating module 327 identifies shapes (such as primitives like cubes, pyramids, prisms, and combinations thereof) from the dense depth maps and, for each surface of each shape identified in the dense depth map, determines a vector defining the location of a surface plane and its normal. In some embodiments, the operation 335 may be performed using volumetric approaches, where the dense depth map is provided to a convolutional neural network trained to apply classifications (such as shapes) to point clouds of depth data. Also, in some embodiments, the operation 335 may be performed using a truncated signed distance field (TSDF), which utilizes multiple views of an object or operating environment and determines distances between each object and its distance to the nearest surface and can be less sensitive to artifacts or irregularities in a depth map.

As shown in the explanatory example of FIG. 3, at an operation 333, the three-dimensional scene shape generating module 327 performs semantic segmentation, identifying objects and boundaries of object regions from the data obtained from the image sensor(s) 305 and the depth sensor(s) 303. According to some embodiments, the operation 333 may be performed by applying one or more neural network-based object recognition algorithms executed by a processor. Alternatively or additionally, in some embodiments, the operation 333 may be performed by a purpose-specific neural processor trained to identify a predefined set of objects in image data.

Referring to the illustrative example of FIG. 3, at an operation 337, the three-dimensional scene shape generating module 327 performs plane detection from the dense depth map generated by the operation 331. According to various embodiments, the operation 337 includes identifying the foundational planes of the real-world operating environment. This typically includes identifying the floor plane and optionally one or more planes defining the walls and ceiling (if any) of the real-world operating environment. In some embodiments, the operation 337 may be performed using one or more of real-time consistent plane detection (RCPD) algorithms and/or random sample consensus (RANSAC) techniques.

As shown in FIG. 3, at an operation 339, the three-dimensional scene shape generating module 327 performs scene reconstruction. In some embodiments, this includes generating one or more incremental meshes representing the three-dimensional features of the real-world operating environment based on the outputs of the operations 333 and 335. According to various embodiments, at the operation 339, an initial coarse mesh is generated and may include planar cells defined by depth points and edges connecting depth points of part or all of the space to be described by a surface mesh. In some embodiments, the initial coarse mesh covers only the outer boundary of the space to be described. In other embodiments, the initial mesh covers the full area of the space to be represented through the mesh. Starting from the initial coarse mesh, additional new depth points at points near the existing coarse mesh are calculated and new elements are incrementally added to the mesh, hence the name "incremental mesh." Techniques suitable for incrementing and deepening a mesh of the three-dimensional forms obtained from depth data according to this disclosure include, without limitation, advancing front techniques and automatic hex-mesh generation.

According to various embodiments, the three-dimensional scene shape generating module 327 returns a digital representation 343 of the three-dimensionality of at least a portion of the scene. In some embodiments, the digital representation 343 includes a dense surface map for rendering and reprojecting three-dimensional objects in the scene (such as in the reprojection 295 in FIG. 2F). Additionally, the three-dimensional scene shape generating module 327 returns, based on the plane detection obtained at the operation 337, an anchor configuration for the major tracked planes (such as the floor and ceiling) of the real-world operating environment.

Although FIG. 3 illustrates one example of an architecture 300 for performing three-dimensional scene reconstruction and scene comprehension for XR applications, various changes may be made to FIG. 3. For example, various components may be combined, further subdivided, replicated, omitted, or rearranged and additional components may be added according to particular needs.

Figure 4:
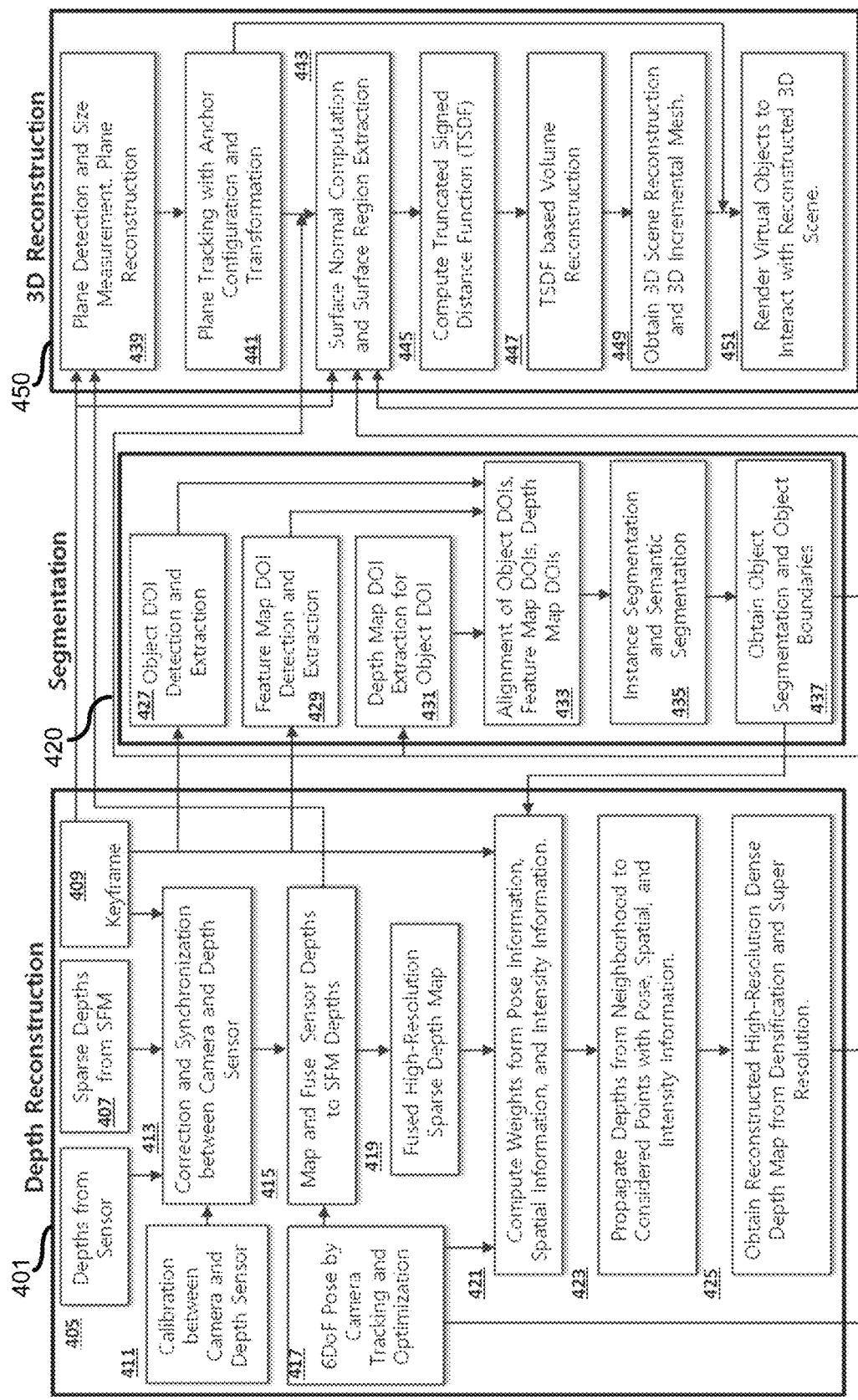
FIG. 4 illustrates an example of an architecture for performing depth reconstruction, segmentation, and three-dimensional reconstruction according to some embodiments of this disclosure.

FIG. 4 illustrates an example of an architecture 400 for performing depth reconstruction, segmentation, and three-dimensional reconstruction according to some embodiments of this disclosure. For ease of explanation, the architecture 400 is described as being used in the device 100 of FIG. 1. Also, the operations described with reference to FIG. 4 may be performed at one or more processing platforms implementing a back end (such as the back end 395 in FIG. 3). In some embodiments, the operations described with reference to the example of FIG. 4 may be performed as sub-parts of the processing operations described above (such as operations 331, 333 and 339 in FIG. 3). However, the architecture 400 may be implemented using any suitable device(s) and in any suitable system(s).

Referring to the illustrative example of FIG. 4, a depth reconstruction stage 401 outputs a reconstructed high-resolution depth map. The reconstructed high-resolution depth map can be generated using various inputs. In this example, the inputs include depth sensor data 405 (such as data provided by the depth sensor(s) 303 in FIG. 3); sparse depth values 407 obtained from a sensor fusion (such as fused depth maps obtained at the operation 329 in FIG. 3); one or more keyframes 409 of image data (such as keyframes obtained at the operation 325 in FIG. 3); calibration data 411 between one or more image sensors 305 and one or more depth sensors 303; and 6DOF pose information 417 (such as the 6DOF pose 315 in FIG. 3) associated with keyframes 409 of image data and depth map data. While it may be possible to construct a camera (such as a camera with two sensors and a shared aperture and lens) so that a depth sensor and a camera/DVS or other image sensor have a common field of view and camera model, such a combined camera/depth sensor in some real-world embodiments is often not a viable design option. Rather, in some embodiments, image data and depth data may be obtained by physically-separate sensors mounted at different locations on an apparatus (such as an HMD), where the image and depth data project light onto a sensor according to different camera models (such as when a depth sensor may be modeled as a pinhole camera while an image sensor has a variable aperture and focal length that is not solely a function of aperture width). According to various embodiments, the calibration data 411 includes a set of values (or, depending on the embodiment, a matrix of values) for projecting data from an image sensor and a depth sensor to a common coordinate system.

Referring to the illustrative example of FIG. 4, at an operation 413, the depth sensor data 405 and the image data in a keyframe 409 are corrected and synchronized such that common locations in the depth and image data are mapped to a common coordinate system. This can be done to help ensure that the same point in physical space represented in both sets of data is assigned to a single common coordinate. In some embodiments, the operation 413 includes correcting for parallax effects associated with a physical distance between the respective locations of the image and depth sensors (such as where an image sensor is closer to a left eye and the depth sensor is closer to the right eye) and reprojecting the image data and depth data based on the calibration data 411 to a common coordinate system.

According to various embodiments, at an operation 415, the depth sensor data 405 is mapped and fused to the sparse depth values 407 obtained from a sensor fusion to obtain a fused high-resolution sparse depth map 419. In some embodiments, mapping and fusing the depth sensor data 405 and the sparse depth values 407 may be performed using a depth fusion filter, such as one configured according to Equation 1 below.

$$D(p) = \begin{cases} d_s(p) & \text{if } d_s(p) > 0, \\ d_r(p) & \text{if } d_s(p) = 0 \text{ and } d_r(p) > 0, \\ d_s(p) & \text{if } d_s(p) > 0 \text{ and } d_r(p) > 0 \text{ and } C_s \text{ is high}, \\ \lambda_s d_s(p) + \lambda_r d_r(p) & \text{if } d_s(p) > 0 \text{ and } d_r(p) > 0 \text{ and } C_s \text{ is low}, \\ 0 & \text{others}. \end{cases}$$

Equation 1

Here, $d_s$ is a depth value for a point p from the depth sensor data 405, dr is a depth value for the point p from the depth data obtained from the sensor fusion operation 415, and C, is a value indicative of confidence of sensor depths for the point p.

In some embodiments according to this disclosure, the fused sparse depth map 419 can be densified by adding additional depth points in the spaces surrounding existing data points, such as by using a depth reconstruction filter. This propagates depth value-based weightings determined from pose information, intensity information, and spatial information. One example approach for performing this function is described in U.S. Patent Application Publication No. 2021/0358158, the contents of which are hereby incorporated by reference. For example, where intensity information (such as values of one or more channels of a color channel of a color model) shows consistency in a given area in the sparse depth map, the depth value in the sparse depth map may be propagated across the area. In this way, propagation of depth values is based on normalized differences in pose difference, color texture, and spatial information in the neighborhood surrounding a point of the sparse depth map. In some embodiments, these localized variations in pose, color, and spatial information may be expressed as weights computed based on a Gaussian distribution, such as the one shown by Equation 2 below.

$w_{pose}=G(\text{diff}_{pose}, \mu_{pose}, \sigma_{pose})$, $w_{color}=G(\text{diff}_{color}, \mu_{color}, \sigma_{color})$, $w_{spatial}=G(\text{diff}_{spatial}, \mu_{spatial}, \sigma_{spatial})$ Equation 2:

As shown in FIG. 4, once Gaussian distribution weights for pose differentials, color differentials, and spatial differentials in the neighborhood of a point p are computed at the operation 421, a depth reconstruction filter T can propagate depth points in the neighborhood N of point p at the operation 423 to obtain a reconstruct dense depth map data 425. In some cases, this may occur according to Equation 3 shown below.

$d(p) = \mathcal{F}_{q \in N(p)}(w_{pose}, w_{color}, w_{spatial}, d, q)$

Equation 3:

At a general level, depth reconstruction and three-dimensional scene reconstruction of a real-world operating environment may be improved through generating a semantic understanding of the operating environment by performing semantic and instance segmentation. As used in this disclosure, semantic understanding may include identifying instances of recognized objects in image data of a real-world operating environment. Once certain shapes in an operating environment are recognized as instances of objects, certain aspects of depth and scene reconstruction may be made easier since information on the objects may be used to assist in the generation of a dense depth map.

Figure 5A:
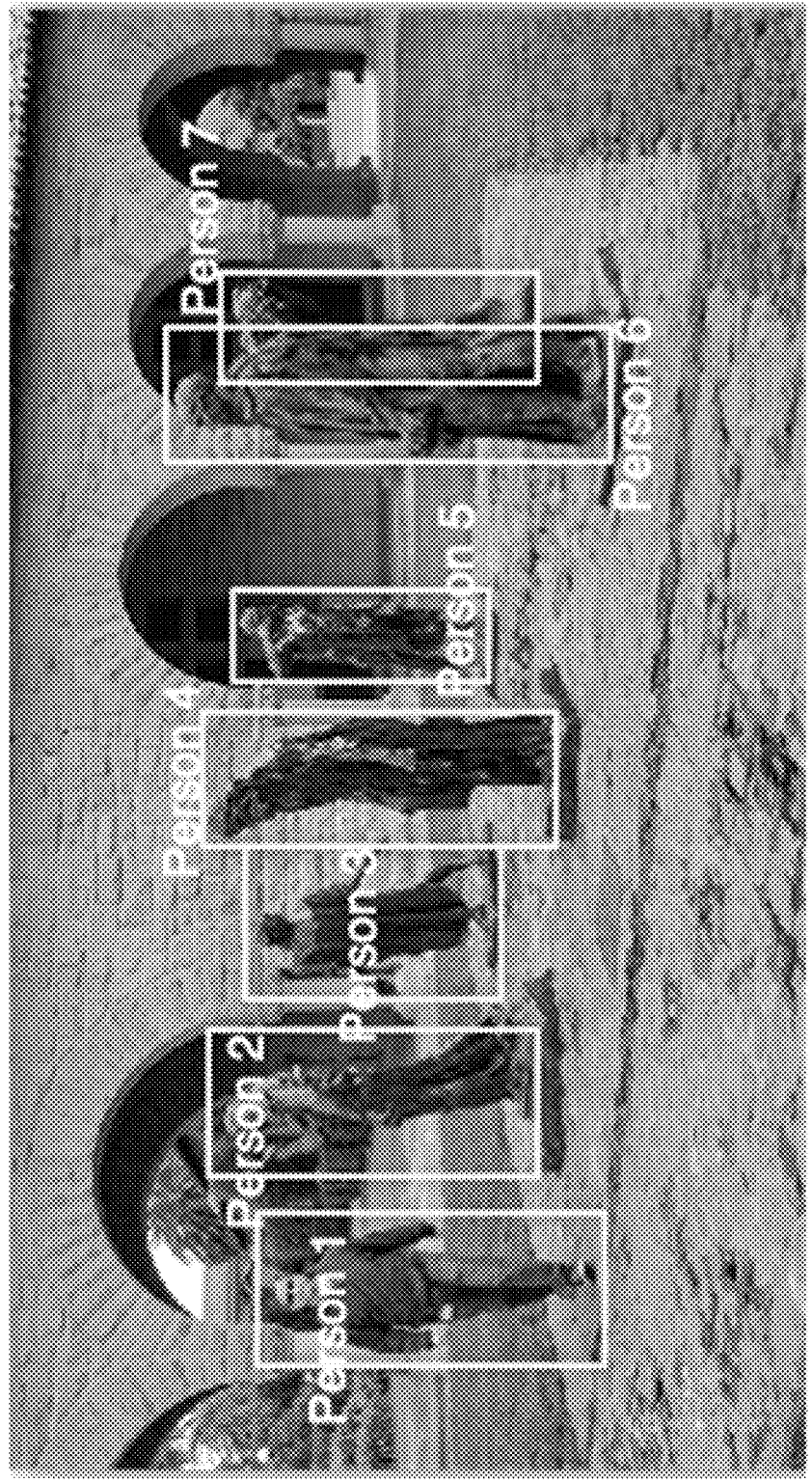

Referring to the illustrative example of FIG. 4, a segmentation stage 420 begins at an operation 427, where one or more frames of image data (such as one or more keyframes 409) are analyzed to identify one or more objects of interest in the image data. Object detection may be performed using any suitable image recognition technique, which can recognize objects from a training set of image data. Examples of this may include, without limitation, a pretrained neural network executed by the processor implementing a back end of the architecture according to this disclosure or a suitably configured separate NPU chip. Having detected one or more forms in the image data corresponding to one or more objects in the training set, one or more regions of interest (ROIs) representing one or more defined regions within the image data can be set at the operation 427. FIG. 5A provides an example visualization of an output of an object ROI detection and extraction operation according to this disclosure.

At an operation 429, for each ROI identified at the operation 427, a feature map of features of interest in each ROI is generated for each frame of image data. According to some embodiments, the efficiency and computational load associated with segmentation and three-dimensional depth reconstruction can be reduced by confining three-dimensional depth reconstruction and scene understanding calculations to the vicinity of a set of one or more predefined objects within the real-world operating environment. By way of illustrative example, if the only virtual object to be added to an XR display includes a digitally-generated chess board, three-dimensional reconstruction of objects where a chess board might be placed (such as on a table) may be needed in some embodiments. In such cases, detailed reconstruction of other recognized objects or the entire real-world operating environment may be unnecessary since an XR-generated chessboard is unlikely to be positioned on the ceiling or on a person in the scene.

At an operation 431, for each ROI identified at the operation 431, a dense depth map for the ROI is determined. In some embodiments, the depth reconstruction stage 401 may be performed globally across the full area of each frame of image data. However, in other embodiments, the depth reconstruction stage 401 may be performed locally, such as only within the vicinity of one or more objects recognized as a foreseeable target or anchor for an item of digital content.

Figure 5B:
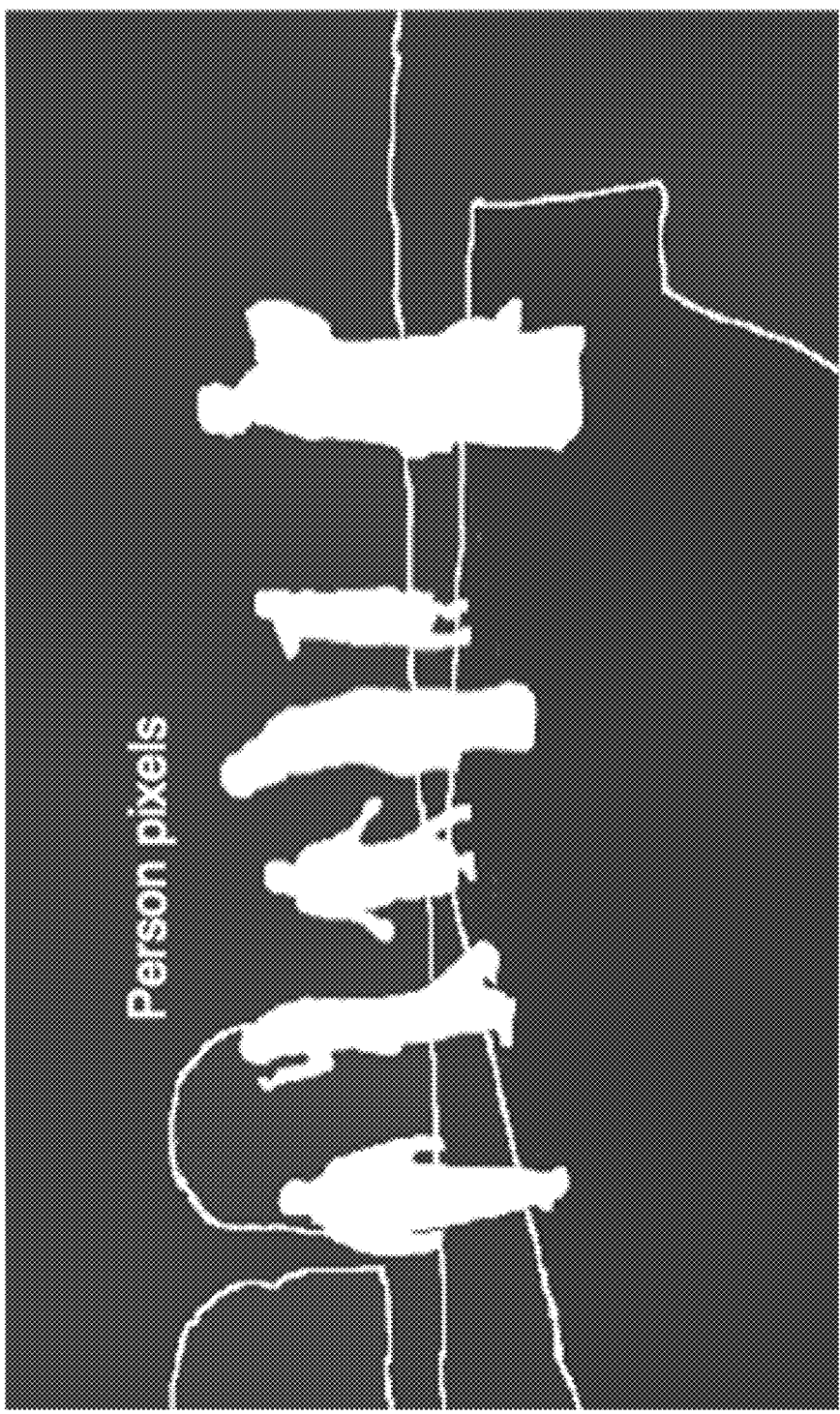

Referring to the illustrative example of FIG. 4, at an operation 433, the one or more ROIs generated at operation 427, as well as the depth and feature maps of the ROIs generated at the operations 429 and 431, are aligned and mapped to a common size scale. This can facilitate semantic segmentation and instance segmentation since the neural networks for performing semantic and instance segmentation may use a single patch size. According to various embodiments, at an operation 435, semantic and instance segmentations are performed on each ROI obtained at the operation 427. Semantic segmentation may include parsing a frame of image data (such as a keyframe 409) to associate regions of pixels within the frame with identified objects. FIG. 5B provides an example visualization of the output of a semantic segmentation process according to some embodiments of this disclosure, where regions within the pixel grid associated with objects identified as people are defined and contrasted with regions associated with other surfaces and objects.

At an operation 435, the processing platform implementing the segmentation stage 420 also performs instance segmentation. Instance segmentation may include parsing image data to divide regions identified by semantic segmentation as being associated with identified objects into sub-regions of pixels associated with specific individual instances of the recognized object(s). FIG. 5C provides an example visualization of the output of instance segmentation according to some embodiments of this disclosure. The regions of an image frame identified as being associated with identified objects (such as people) may be further subdivided to define sub-regions of the image frame associated with individual instances of object data recognized as people. At an operation 437, the processing platform implementing the back end processes obtains boundaries for each identified object in the image frame.

Referring to the illustrative example of FIG. 4, a three-dimensional scene reconstruction stage 450 includes generating a machine representation of the three-dimensional form of one or more of the ROIs determined at the operation 427. In some embodiments, instead of confining the three-dimensional scene reconstruction stage 450 to one or more ROIs, three-dimensional scene reconstruction is performed for all of the areas of the real-world operating environment for which image data and depth data are available.

According to some embodiments, at an operation 453, the processing platform implementing the back end according to some embodiments of this disclosure performs plane detection, size measurement, and plane reconstruction. For example, in some embodiments, the three-dimensional scene reconstruction stage 450 takes as its inputs the 6DOF pose information 417, dense depth map data 425, frames of image data (such as one or more keyframes 409), and object segmentation and object boundary data. Using the pose information 417 to correct for projection angles, the processing platform identifies, in the dense depth map data, regions within the real-world operating environment presenting candidate planes. Using the image data and object boundary data, the processing platform also determines the size and boundary of each of one or more detected planes.

As shown in the illustrative example of FIG. 4, at an operation 441, the processing platform performing three-dimensional scene reconstruction sets one or more anchor points to define and track the position of the detected plane in response to changes in pose of the sensors providing sensor data for scene reconstruction and scene understanding (such as the sensor module 301 in FIG. 3). According to various embodiments, at an operation 443, the processing platform determines, for each detected and tracked plane, a vector representing the normal of the detected plane and coordinates defining the known extents of the detected plane.

Referring to the illustrative example of FIG. 4, at an operation 445, values of a TSDF are computed based on the surface normal and dense depth map to generate one or more voxel grids for the one or more areas representing one or more planes detected and tracked at the operations 439 and 441. A voxel grid may include a grid or raster of coordinate regions (such as pixel-like regions), each of which may be associated with a depth value (rather than a value in a color space as is the case for pixels of a digital image). By calculating the TSDF at the operation 445, the processing platform expands the dense depth cloud data, which only defines a depth value at discrete points of zero area within the image frame, to define regions of non-zero area associated with depth values.

At an operation 447, the processing platform performs volume reconstruction based on the one or more voxel grids obtained through computation of the TSDF for one or more regions of the real-world operating environment to obtain a three-dimensional scene reconstruction 449. Specifically, at the operation 447, image data is used to transform the voxel grid (which in many embodiments includes a grid or matrix of square or hexagonal voxels that may or may not accurately represent object boundaries or edges of objects in the real-world operating environment) to a three-dimensional mesh of depth points connected by lines to define planar regions (typically triangles) within part or all of the real-world operating environment described by the one or more voxel grids. According to various embodiments, the three-dimensional mesh may be generated incrementally from the boundaries of planes or objects, although other meshing algorithms may be used in other embodiments according to this disclosure.

As shown in FIG. 4, at an operation 451, one or more virtual objects are rendered at one or more locations in order to appear as if they interact with the reconstructed three-dimensional scene, where the one or more locations at which the one or more virtual objects are rendered are based (at least in part) on at least one generated three-dimensional mesh of at least one surface in the real-world operating environment and semantic segmentation of the scene. For example, a virtual object chessboard may appear to sit directly on the surface of a table like a real chessboard when the table has been semantically recognized as an instance of a table (and thus a suitable surface for placing a virtual chessboard) and because the table, in particular, has a top that has been reconstructed from image and depth data.

Depending on the parameters of the XR display and, in particular, the size of an object, plane reconstruction at the operation 439 may be performed on an as-needed basis, where the computational need is based on one or dimensions of a virtual object to be positioned on a reconstructed plane. For example, when an XR application specifies a chessboard as a virtual object to appear on the surface of a table or other real-world component, the operation 439 may only be performed to the extent necessary to reconstruct enough of a plane upon which to position the virtual chessboard. The operation 439 may stop when a flat area of sufficient size has been determined.

Although FIG. 4 illustrates one example of an architecture 400 for performing depth reconstruction, segmentation, and three-dimensional reconstruction, various changes may be made to FIG. 4. For example, various components may be combined, further subdivided, replicated, omitted, or rearranged and additional components may be added according to particular needs.

FIGS. 5A-5C illustrate visual aspects of object detection, semantic segmentation, and instance segmentation according to some embodiments of this disclosure. Referring to the illustrative example of FIG. 5A, a frame of image data 500 of a scene is shown. The scene includes a person and six sculptures having human forms. In the example of FIG. 5A, object detection and extraction of regions of interest (ROIs) according to some embodiments of this disclosure have been performed. As shown in FIG. 5A, ROIs corresponding to objects for which a neural network trained for object recognition has been detected have been defined. In this example, the ROIs include boxes around the human forms labeled "Person 1" through "Person 7." In this example, while ROIs containing recognized objects have been found, the specific boundaries between the detected objects and the rest of the scene in the image data 500 have not yet been determined, nor have the boundaries between overlapping instances of the same object (such as the regions designated "Person 6" and "Person 7") been determined.

FIG. 5B provides an illustrative visualization of a semantic segmentation 505 of frame of image data 500 from FIG. 5A. Referring to the explanatory example of FIG. 5B, each the constituent pixels of the image data 500 has been classified (such as by using a machine learning tool trained for semantic segmentation, like DeepLab) and colored according to their classification. In this example, pixels associated with human forms (labeled "person pixels" in the figure) have been colored white, while background components of the scene have been colored in shades of dark grey.

FIG. 5C provides an illustrative visualization of an instance segmentation 510 as applied to the semantic segmentation 505 in FIG. 5B. As described elsewhere in this disclosure, instance segmentation includes further subdividing a semantic segmentation to recognize the regions of pixels including individual instances of a recognized object. In this illustrative example, the pixels labeled as "person pixels" in FIG. 5B have been separately identified as instances of people and separately labeled "Person 1" through "Person 7." Additionally, an object boundary 515 between "Person 6" and "Person 7" has been determined from what was, in FIG. 5B, an undifferentiated region of pixels generally associated with image content recognized as having human forms.

Although FIGS. 5A-5C illustrate visual aspects of object detection, semantic segmentation, and instance segmentation, various changes may be made to FIGS. 5A-5C. For example, the contents of actual images that are obtained and processed can vary widely, and FIGS. 5A-5C do not limit this disclosure to any specific type of scene or image.

Figure 6:
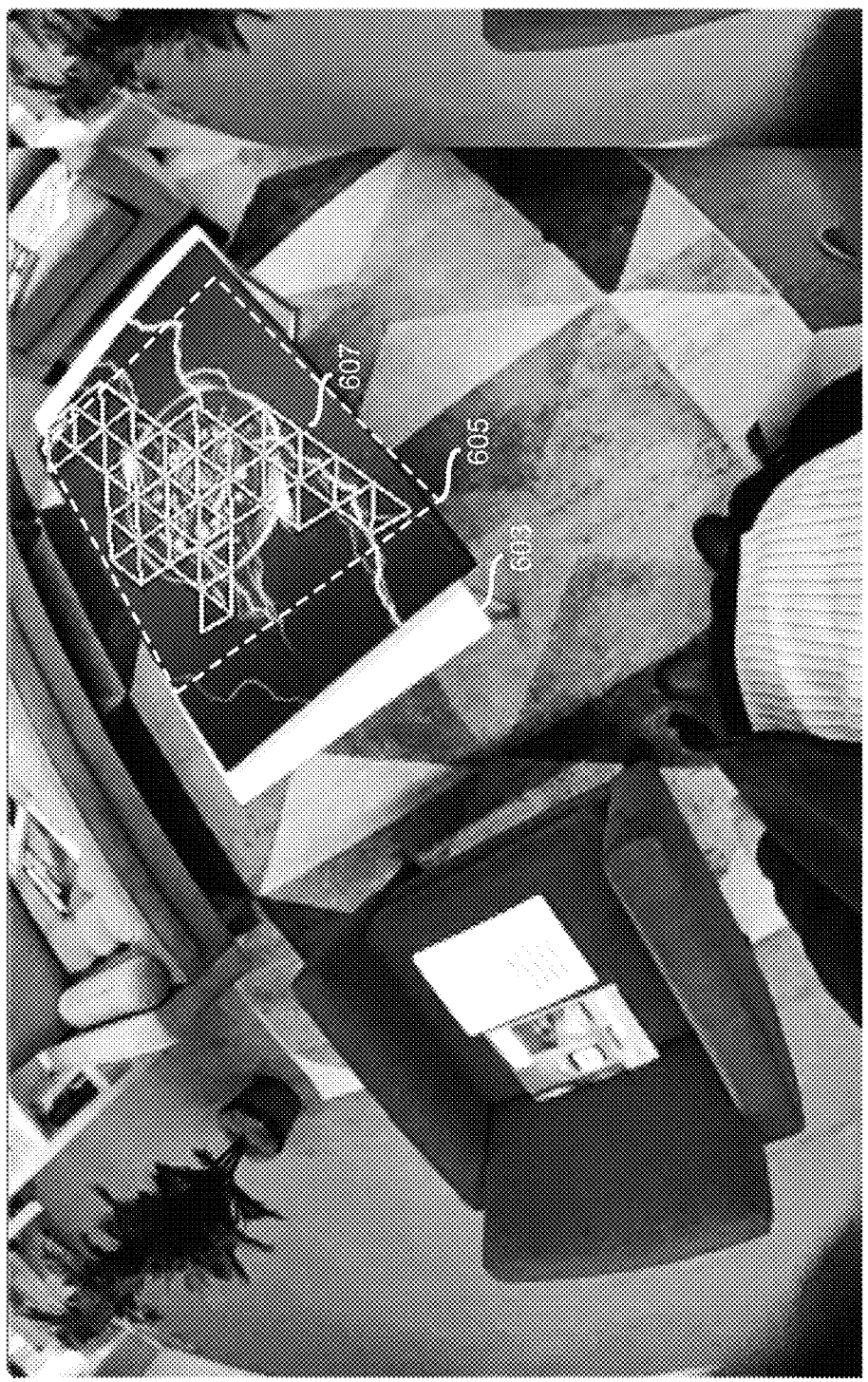
FIG. 6 illustrates an example of plane detection and reconstruction according to some embodiments of this disclosure.

FIG. 6 illustrates an example of plane detection and reconstruction according to some embodiments of this disclosure. Referring to the illustrative example of FIG. 6, a frame 600 of image data is shown. The frame 600 of image data includes a sensor view of a real-world operating environment of an XR device (such as an HMD). The scene data may be obtained for an XR application configured to render a virtual chessboard on a suitable surface represented in the frame 600 of image data. Thus, the technical challenges associated with providing the above-described XR display of a virtual chessboard in this real-world operating environment include finding a planar surface that is dimensionally suitable (such as occupying sufficient area within the frame 600 to appear to support the virtual chessboard) and, in some embodiments, that is semantically suitable (such as belonging to a class of recognized objects the XR application permits virtual chessboards to be placed upon).

In this explanatory example, using the results of a previously-performed segmentation of objects in the frame 600, a table 603 is identified as semantically suitable for positioning the virtual object. According to various embodiments, the output of an instance segmentation (such as the instance segmentation 510) showing the boundaries of the table 603 is compared against data showing a rendered size 605 of the virtual chessboard to determine whether the table 603 is large enough to position the virtual chessboard. Responsive to determining that the table 603 is large enough to position the virtual chessboard, a three-dimensional reconstruction (such as an incremental mesh 607) of the table 603 is generated.

Although FIG. 6 illustrates one example of plane detection and reconstruction, various changes may be made to FIG. 6. For example, the contents of actual images that are obtained and processed can vary widely, and FIG. 6 does not limit this disclosure to any specific type of scene or image.

FIG. 7 illustrates operations of an example method 700 for performing three-dimensional scene reconstruction and scene comprehension for XR applications according to some embodiments of this disclosure. The operations of the method 700 may be performed at one or more processing platforms implementing an architecture (such as the architecture 300 in FIG. 3) including a front end and a back end according to some embodiments of this disclosure.

Referring to the illustrative example of FIG. 7, at an operation 705, a processing platform (such as the device 100 in FIG. 1) implementing a front end (such as the front end 397 in FIG. 3) receives depth, image, and movement data from a sensor module (such as the sensor module 301 in FIG. 3) trained upon a portion of a real-world operating environment. According to some embodiments, the depth data includes data from a depth sensor (such as the depth sensor 303), and the image data includes image frames from an image sensor (such as the image sensor 305). Motion data may include sensor outputs recording changes in location of a sensor module, as well as data recording changes in the viewing angle of the sensor module.

As shown in FIG. 7, at an operation 710, the processing platform implementing the front end of the architecture determines an initial six-degree-of-freedom pose (such as the 6DOF pose 315 in FIG. 3) based on one or more of the depth data, the image data, and the movement data. At an operation 715, the initial pose data is passed to the back end of the architecture (such as the back end 395 in FIG. 3) to determine one or more of a keyframe or optimized pose. In some embodiments, the sensors (such as the IMU 307) in the sensor module 301 may be susceptible to drift, external effects, or other factors that add noise or otherwise degrade the accuracy of the determined pose. In embodiments in which three-dimensional reconstruction involves calculating projections of rays from one or more specified poses (such as in TSDF-based approaches), errors or inconsistencies in pose data can be readily propagated into the three-dimensional reconstruction of the scene. According to various embodiments, at an operation 725, the back end generates a three-dimensional reconstruction of at least part of the real-world scene based on the image data, the depth data, and (in some embodiments) the optimized pose data. The three-dimensional reconstruction may include one or more of a dense depth map, a dense surface mesh describing a portion of the real-world scene, and one or more semantically segmented objects within the scene.

At an operation 725, the three-dimensional reconstruction of the real-world scene generated at the operation 720 is passed from the back end of the processing architecture to the front end. At an operation 730, the front end renders a frame of XR content including a virtual three-dimensional object positioned on a surface or otherwise interacting with a surface of the real-world scene.

Although FIG. 7 illustrates operations of one example method 700 for performing three-dimensional scene reconstruction and scene comprehension for XR applications, various changes may be made to FIG. 7. For example, while shown as a series of steps, various steps in FIG. 7 may overlap, occur in parallel, occur in a different order, or occur any number of times. Also, various steps may be omitted or replaced by other steps.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An apparatus comprising:
a depth sensor,
an image sensor;
an inertial measurement unit (IMU); and
a controller configured to:
  receive depth data of a real-world scene from the depth sensor;
  receive image data of the real-world scene from the image sensor;
  receive movement data of the depth sensor and the image sensor from the IMU;
  determine an initial six-degree-of-freedom (6DOF) pose of the apparatus based on at least one of the depth data, the image data, and the movement data;
  pass the initial 6DOF pose of the apparatus to a back end to obtain an optimized pose, wherein the optimized pose comprises at least one of: a keyframe based on the initial 6DOF pose and a refinement of the initial 6DOF pose to compensate for measurement inaccuracies of the IMU;
  generate, based on the optimized pose, the image data, and the depth data, a three-dimensional reconstruction of the real-world scene, wherein the three-dimensional reconstruction comprises at least one of a dense depth map of the real-world scene, a dense surface mesh of the real-world scene, and one or more semantically segmented objects;
  pass the three-dimensional reconstruction of the real-world scene to a front end; and
  render, at the front end, an XR frame, wherein the XR frame comprises a three-dimensional XR object projected on one or more surfaces of the real-world scene.

2. The apparatus of claim 1, wherein the front end and the back end are implemented on separate computing platforms.

3. The apparatus of claim 1, wherein:
the controller is configured to identify the one or more semantically segmented objects; and
to identify the one or more semantically segmented objects, the controller is configured to:
  detect one or more objects within the image data;
  extract, for each of the one or more detected objects, a region of interest (ROI); and
  for each extracted ROI, perform semantic segmentation to categorize the detected object in the ROI as an identified instance of a predefined object.

4. The apparatus of claim 3, wherein the controller is further configured to:
generate, for each extracted ROI, a feature map of the detected object in the ROI;
generate, for each extracted ROI, a dense depth map of the detected object in the ROI;
for each extracted ROI, map the detected object to a common scale based on at least one of the feature map of the detected object in the ROI and the dense depth map of the detected object in the ROI; and
perform semantic segmentation based on the detected object as mapped to the common scale.

5. The apparatus of claim 4, wherein the controller is configured to generate the dense depth map of the real-world scene based on the one or more dense depth maps of the one or more detected objects in the one or more ROIs.

6. The apparatus of claim 1, wherein:
the controller is configured to generate the dense depth map of the real-world scene based on the image data of the real-world scene and the depth data of the real-world scene; and
the controller is configured to use the image data to identify object boundaries of the dense depth map of the real-world scene.

7. The apparatus of claim 1, wherein the controller is further configured to:
determine an input requirement of the XR frame, wherein the input requirement comprises an indication of whether a general three-dimensional reconstruction of the real-world scene is required; and
responsive to the input requirement of the XR frame indicating that the general three-dimensional reconstruction of the real-world scene is not required, generate a three-dimensional reconstruction of a target region of the real-world scene.

8. A method for performing three-dimensional scene reconstruction and understanding for extended reality (XR) applications comprising:
receiving depth data of a real-world scene from a depth sensor of an apparatus;
receiving image data of the real-world scene from an image sensor of the apparatus;
receiving movement data of the depth sensor and the image sensor from an inertial measurement unit (IMU) of the apparatus;
determining an initial six-degree-of-freedom (6DOF) pose of the apparatus based on at least one of the depth data, the image data, and the movement data;
passing the initial 6DOF pose of the apparatus to a back end to obtain an optimized pose, wherein the optimized pose comprises at least one of: a keyframe based on the initial 6DOF pose and a refinement of the initial 6DOF pose to compensate for measurement inaccuracies of the IMU;
generating, based on the optimized pose, the image data, and the depth data, a three-dimensional reconstruction of the real-world scene, wherein the three-dimensional reconstruction comprises at least one of a dense depth map of the real-world scene, a dense surface mesh of the real-world scene, and one or more semantically segmented objects;

passing the three-dimensional reconstruction of the real-world scene to a front end; and rendering, at the front end, an XR frame, where the XR frame includes a three-dimensional XR object projected on one or more surfaces of the real-world scene.

9. The method of claim 8, wherein the front end and the back end are implemented on separate computing platforms.

10. The method of claim 8, further comprising:
detecting one or more objects within the image data;
extracting, for each of the one or more detected objects, a region of interest (ROI); and
for each extracted ROI, performing semantic segmentation to categorize the detected object in the ROI as an identified instance of a predefined object.

11. The method of claim 10, further comprising:
generating, for each extracted ROI, a feature map of the detected object in the ROI;
generating, for each extracted ROI, a dense depth map of the detected object in the ROI;
for each extracted ROI, mapping the detected object to a common scale based on at least one of the feature map of the detected object in the ROI and the dense depth map of the detected object in the ROI; and
performing semantic segmentation based on the detected object as mapped to the common scale.

12. The method of claim 11, wherein the dense depth map of the real-world scene is generated based on the one or more dense depth maps of the one or more detected objects in the one or more ROIs.

13. The method of claim 8, wherein:
the dense depth map of the real-world scene is generated based on the image data of the real-world scene and the depth data of the real-world scene; and
the image data is used to identify object boundaries of the dense depth map of the real-world scene.

14. The method of claim 8, further comprising:
determining an input requirement of the XR frame, wherein the input requirement comprises an indication of whether a general three-dimensional reconstruction of the real-world scene is required; and
responsive to the input requirement of the XR frame indicating that the general three-dimensional reconstruction of the real-world scene is not required, generating a three-dimensional reconstruction of a target region of the real-world scene.

15. A non-transitory computer-readable medium containing instructions that, when executed by at least one processor of an apparatus including a depth sensor, an image sensor, and an inertial measurement unit (IMU), causes the apparatus to:
receive depth data of a real-world scene from the depth sensor;
receive image data of the real-world scene from the image sensor;
receive movement data of the depth sensor and the image sensor from the IMU;
determine an initial six-degree-of-freedom (6DOF) pose of the apparatus based on at least one of the depth data, the image data, and the movement data;

pass the initial 6DOF pose of the apparatus to a back end to obtain an optimized pose, wherein the optimized pose comprises at least one of: a keyframe based on the initial 6DOF pose and a refinement of the initial 6DOF pose to compensate for measurement inaccuracies of the IMU;

generate, based on the optimized pose, the image data, and the depth data, a three-dimensional reconstruction of the real-world scene, wherein the three-dimensional reconstruction comprises at least one of a dense depth map of the real-world scene, a dense surface mesh of the real-world scene, and one or more semantically segmented objects;

pass the three-dimensional reconstruction of the real-world scene to a front end; and render, at the front end, an XR frame, wherein the XR frame comprises a three-dimensional XR object projected on one or more surfaces of the real-world scene.

16. The non-transitory computer-readable medium of claim 15, wherein the front end and the back end are implemented on separate computing platforms.

17. The non-transitory computer-readable medium of claim 15, further containing instructions that, when executed by the at least one processor, cause the apparatus to:
detect one or more objects within the image data;
extract, for each of the one or more detected objects, a region of interest (ROI); and
for each extracted ROI, perform semantic segmentation to categorize the detected object in the ROI as an identified instance of a predefined object.

18. The non-transitory computer-readable medium of claim 17, further containing instructions that, when executed by the at least one processor, cause the apparatus to:
generate, for each extracted ROI, a feature map of the detected object in the ROI;
generate, for each extracted ROI, a dense depth map of the detected object in the ROI;
for each extracted ROI, map the detected object to a common scale based on at least one of the feature map of the detected object in the ROI and the dense depth map of the detected object in the ROI; and
perform semantic segmentation based on the detected object as mapped to the common scale.

19. The non-transitory computer-readable medium of claim 18, wherein the dense depth map of the real-world scene is based on the one or more dense depth maps of the one or more detected objects in the one or more ROIs.

20. The non-transitory computer-readable medium of claim 15, wherein:
the instructions when executed cause the apparatus to generate the dense depth map of the real-world scene based on the image data of the real-world scene and the depth data of the real-world scene; and
the instructions when executed cause the apparatus to use the image data to identify object boundaries of the dense depth map of the real-world scene.

* * * * *